United States Patent
Ohno et al.

(10) Patent No.: US 10,247,290 B2
(45) Date of Patent: Apr. 2, 2019

(54) BICYCLE REAR SPROCKET

(71) Applicant: SHIMANO INC., Sakai (JP)

(72) Inventors: Akihiro Ohno, Sakai (JP); Toshinari Oishi, Sakai (JP); Tsuyoshi Fukumori, Sakai (JP)

(73) Assignee: SHIMANO INC., Sakai (JP)

( * ) Notice: Subject to any disclaimer, the term of this patent is extended or adjusted under 35 U.S.C. 154(b) by 109 days.

(21) Appl. No.: 15/489,675

(22) Filed: Apr. 17, 2017

(65) Prior Publication Data

US 2018/0299004 A1    Oct. 18, 2018

(51) Int. Cl.
B62M 9/10    (2006.01)
F16H 55/30    (2006.01)

(52) U.S. Cl.
CPC .............. F16H 55/30 (2013.01); B62M 9/10 (2013.01)

(58) Field of Classification Search
CPC .......... B62M 9/10; B62M 9/105; B62M 9/12; B62M 1/36; F16H 55/30
USPC ........................................................ 474/160
See application file for complete search history.

(56) References Cited

U.S. PATENT DOCUMENTS

| | | | | |
|---|---|---|---|---|
| 5,087,226 A * | 2/1992 | Nagano | ................... | B62M 9/10 474/160 |
| 5,192,248 A * | 3/1993 | Nagano | ................... | B62M 9/10 474/140 |
| 5,413,534 A * | 5/1995 | Nagano | ................... | B62M 9/10 474/160 |
| 5,609,536 A * | 3/1997 | Hsu | ................... | B62M 9/10 474/160 |
| 5,738,603 A * | 4/1998 | Schmidt | ................... | B62M 9/10 474/158 |
| 5,876,296 A * | 3/1999 | Hsu | ................... | B62M 9/10 474/140 |
| 5,971,878 A * | 10/1999 | Leng | ................... | F16H 55/30 474/160 |
| 6,007,442 A * | 12/1999 | Schmidt | ................... | B62M 9/10 474/122 |
| 6,572,500 B2 * | 6/2003 | Tetsuka | ................... | B62M 9/10 474/160 |
| 8,235,850 B2 * | 8/2012 | Lin | ................... | B62M 9/105 474/160 |
| 8,550,944 B2 * | 10/2013 | Esquibel | ................... | B62M 9/10 474/160 |
| 9,457,870 B2 * | 10/2016 | Sugimoto | ................... | B62M 9/105 |
| 9,701,364 B2 * | 7/2017 | Sugimoto | ................... | B62M 1/36 |
| 9,915,336 B1 * | 3/2018 | Fukunaga | ................... | B62M 9/10 |
| 9,919,764 B2 * | 3/2018 | Fukumori | ................... | B62M 9/10 |
| 9,944,351 B2 * | 4/2018 | Braun | ................... | B62M 9/131 |

(Continued)

Primary Examiner — Henry Y Liu
(74) Attorney, Agent, or Firm — Mori & Ward, LLP

(57) ABSTRACT

A bicycle rear sprocket comprises a sprocket body, a plurality of sprocket teeth, a shifting facilitation recess, and an upshifting facilitation projection. The plurality of sprocket teeth extends radially outwardly from the sprocket body. The shifting facilitation recess is to facilitate a shifting operation in which a bicycle chain is shifted between the bicycle rear sprocket and a smaller rear sprocket adjacent to the bicycle rear sprocket without another sprocket between the bicycle rear sprocket and the smaller rear sprocket. The upshifting facilitation projection is provided in the shifting facilitation recess to support the bicycle chain in an upshifting operation in which the bicycle chain is shifted from the bicycle rear sprocket to the smaller rear sprocket.

14 Claims, 20 Drawing Sheets

(56) References Cited

U.S. PATENT DOCUMENTS

| | | | |
|---|---|---|---|
| 9,963,196 B2* | 5/2018 | Sugimoto | F16H 55/303 |
| 10,155,566 B2* | 12/2018 | Sugimoto | B62M 9/105 |
| 2002/0006842 A1* | 1/2002 | Tetsuka | B62M 9/10 |
| | | | 474/160 |
| 2010/0081531 A1* | 4/2010 | Esquibel | B62M 9/10 |
| | | | 474/160 |
| 2010/0137086 A1* | 6/2010 | Lin | B62M 9/105 |
| | | | 474/160 |
| 2013/0139642 A1* | 6/2013 | Reiter | B62M 9/105 |
| | | | 74/594.2 |
| 2014/0338494 A1* | 11/2014 | Sugimoto | B62M 1/36 |
| | | | 74/594.2 |
| 2015/0210352 A1* | 7/2015 | Sugimoto | B62M 9/105 |
| | | | 474/80 |
| 2016/0207590 A1* | 7/2016 | Fukumori | F16H 55/30 |

* cited by examiner

BICYCLE REAR SPROCKET

BACKGROUND OF THE INVENTION

Field of the Invention

The present invention relates to a bicycle rear sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle rear sprocket comprises a sprocket body, a plurality of sprocket teeth, a shifting facilitation recess, and an upshifting facilitation projection. The plurality of sprocket teeth extends radially outwardly from the sprocket body. The shifting facilitation recess is to facilitate a shifting operation in which a bicycle chain is shifted between the bicycle rear sprocket and a smaller rear sprocket adjacent to the bicycle rear sprocket without another sprocket between the bicycle rear sprocket and the smaller rear sprocket. The upshifting facilitation projection is provided in the shifting facilitation recess to support the bicycle chain in an upshifting operation in which the bicycle chain is shifted from the bicycle rear sprocket to the smaller rear sprocket.

With the bicycle rear sprocket according to the first aspect, the upshifting facilitation projection smoothly brings the bicycle chain into engagement with the smaller rear sprocket in the upshifting operation.

In accordance with a second aspect of the present invention, the bicycle rear sprocket according to the first aspect is configured so that the upshifting facilitation projection is integrally provided with the sprocket body as a one-piece unitary member.

With the bicycle rear sprocket according to the second aspect, it is possible to easily manufacture the bicycle rear sprocket.

In accordance with a third aspect of the present invention, the bicycle rear sprocket according to the first aspect is configured so that the upshifting facilitation projection is a separate member from the sprocket body.

With the bicycle rear sprocket according to the third aspect, it is possible to improve design freedom of the shape of the upshifting facilitation projection.

In accordance with a fourth aspect of the present invention, the bicycle rear sprocket according to any one of the first to third aspects is configured so that the upshifting facilitation projection includes a chain contact surface contactable with the bicycle chain in the upshifting operation. The chain contact surface is inclined relative to a sprocket center plane perpendicular to a rotational center axis of the bicycle rear sprocket. The sprocket center plane bisects the bicycle rear sprocket in an axial direction with respect to the rotational center axis.

With the bicycle rear sprocket according to the fourth aspect, the upshifting facilitation projection more smoothly brings the bicycle chain into engagement with the smaller rear sprocket in the upshifting operation.

In accordance with a fifth aspect of the present invention, the bicycle rear sprocket according to any one of the first to fourth aspects is configured so that the upshifting facilitation projection includes a chain contact surface contactable with the bicycle chain in the upshifting operation. The chain contact surface extends in an axial direction with respect to a rotational center axis of the bicycle rear sprocket.

With the bicycle rear sprocket according to the fifth aspect, the upshifting facilitation projection more smoothly brings the bicycle chain into engagement with the smaller rear sprocket in the upshifting operation.

In accordance with a sixth aspect of the present invention, the bicycle rear sprocket according to any one of the first to fifth aspects is configured so that the upshifting facilitation projection includes a chain contact surface contactable with the bicycle chain in the upshifting operation. The chain contact surface includes a flat surface.

With the bicycle rear sprocket according to the sixth aspect, the chain contact surface stably supports the bicycle chain in the upshifting operation.

In accordance with a seventh aspect of the present invention, the bicycle rear sprocket according to any one of the first to sixth aspects is configured so that the upshifting facilitation projection includes a chain contact surface contactable with the bicycle chain in the upshifting operation. The chain contact surface is inclined relative to a first radial direction perpendicular to a rotational center axis of the bicycle rear sprocket, the first radial direction extending from the rotational center axis to the upshifting facilitation projection.

With the bicycle rear sprocket according to the seventh aspect, it is possible to arrange the chain contact surface to extend along the bicycle chain in the upshifting operation.

In accordance with an eighth aspect of the present invention, the bicycle rear sprocket according to any one of the first to seventh aspects is configured so that the upshifting facilitation projection includes a chain contact surface contactable with the bicycle chain in the upshifting operation. The chain contact surface includes a first circumferential end and a second circumferential end. The chain contact surface extends between the first circumferential end and the second circumferential end. A first radial distance provided between a rotational center axis of the bicycle rear sprocket and the first circumferential end is different from a second radial distance provided between the rotational center axis and the second circumferential end.

With the bicycle rear sprocket according to the eighth aspect, it is possible to arrange the chain contact surface to extend along the bicycle chain in the upshifting operation.

In accordance with a ninth aspect of the present invention, the bicycle rear sprocket according to the eighth aspect is configured so that the first circumferential end is provided on an upstream side of the second circumferential end in a driving rotational direction in which the bicycle rear sprocket is rotated about the rotational center axis during pedaling. The first radial distance is smaller than the second radial distance.

With the bicycle rear sprocket according to the ninth aspect, it is possible to arrange the chain contact surface to extend along the bicycle chain in the upshifting operation.

In accordance with a tenth aspect of the present invention, the bicycle rear sprocket according to any one of the first to ninth aspects is configured so that the plurality of sprocket teeth includes a first tooth and a second tooth. The first tooth and the second tooth are provided in an angular range of the shifting facilitation recess. The upshifting facilitation projection is provided between the first tooth and the second tooth in a circumferential direction with respect to a rotational center axis of the bicycle rear sprocket.

With the bicycle rear sprocket according to the tenth aspect, the upshifting facilitation projection more smoothly brings the bicycle chain into engagement with the smaller rear sprocket in the upshifting operation.

In accordance with an eleventh aspect of the present invention, the bicycle rear sprocket according to the tenth aspect is configured so that the shifting facilitation recess is continuously provided between the first tooth and the second tooth through the upshifting facilitation projection.

With the bicycle rear sprocket according to the eleventh aspect, the upshifting facilitation projection more smoothly brings the bicycle chain into engagement with the smaller rear sprocket in the upshifting operation.

In accordance with a twelfth aspect of the present invention, the bicycle rear sprocket according to any one of the first to eleventh aspects is configured so that the plurality of sprocket teeth includes at least one driving tooth.

With the bicycle rear sprocket according to the twelfth aspect, the upshifting facilitation projection more smoothly brings the bicycle chain into engagement with the smaller rear sprocket in the upshifting operation.

In accordance with a thirteenth aspect of the present invention, the bicycle rear sprocket according to the first aspect is configured so that the plurality of sprocket teeth includes a first driving tooth and a second driving tooth. The first driving tooth has a first maximum axial width extending in an axial direction with respect to a rotational center axis of the bicycle rear sprocket. The second driving tooth has a second maximum axial width extending in the axial direction. The first maximum axial width is larger than the second maximum axial width.

With the bicycle rear sprocket according to the thirteenth aspect, it is possible to improve chain-holding performance of the bicycle rear sprocket with smoothening the upshifting operation.

In accordance with a fourteenth aspect of the present invention, the bicycle rear sprocket according to any one of the first to thirteenth aspects is configured so that the sprocket body includes a first axial surface and a second axial surface provided on a reverse side of the first axial surface in an axial direction with respect to a rotational center axis of the bicycle rear sprocket. An axial end of the upshifting facilitation projection is provided in an axial area extending from the first axial surface to the second axial surface.

With the bicycle rear sprocket according to the fourteenth aspect, the upshifting facilitation projection more smoothly brings the bicycle chain into engagement with the smaller rear sprocket in the upshifting operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
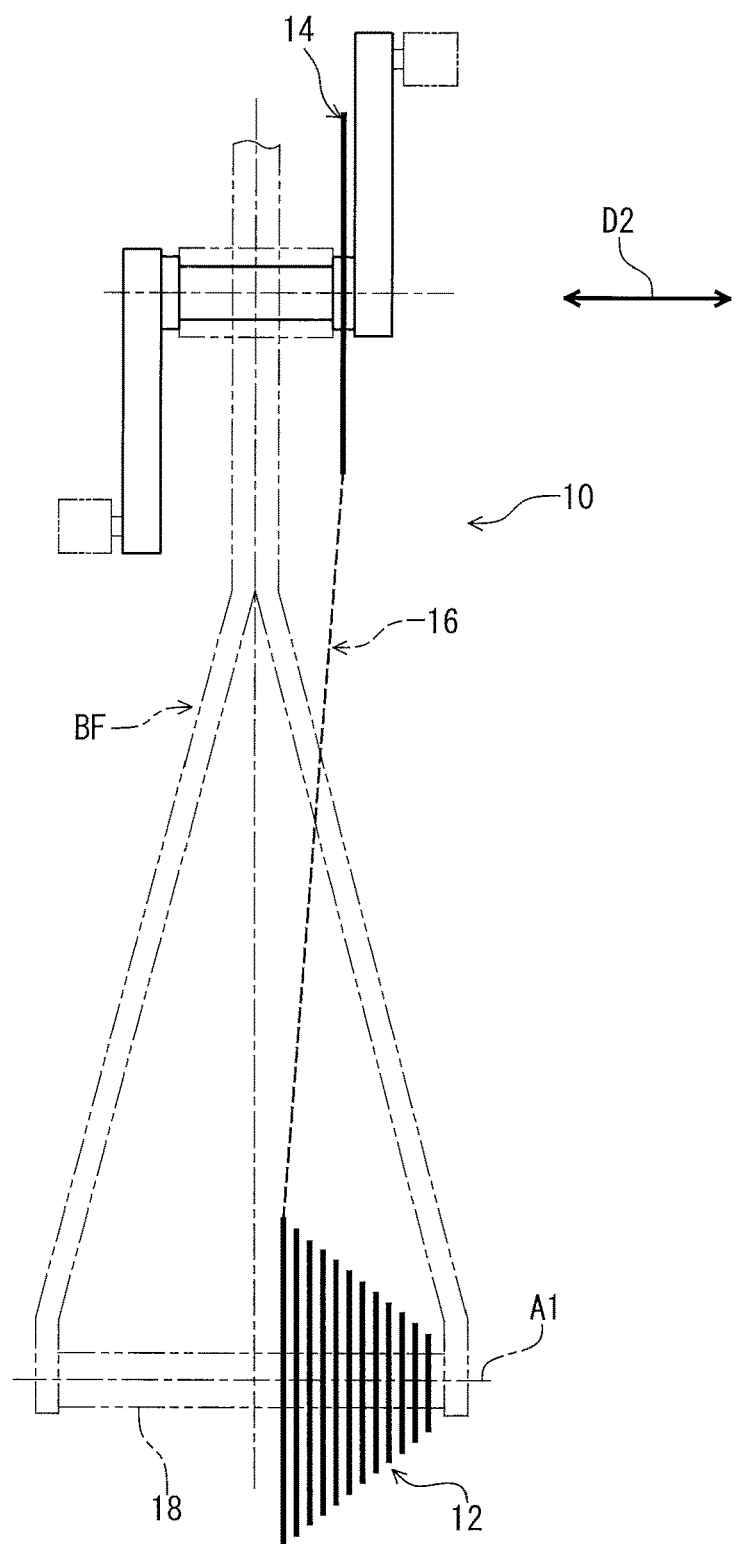
FIG. 1 is a schematic diagram of a bicycle drive train including a bicycle rear sprocket in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle drive train 10 comprises a bicycle sprocket assembly 12, a bicycle front sprocket 14, and a bicycle chain 16. The bicycle sprocket assembly 12 is attached to a bicycle rear hub assembly 18. The bicycle rear hub assembly 18 is mounted to a bicycle frame BF. The bicycle sprocket assembly 12 has a rotational center axis A1 and is rotatably supported by the bicycle rear hub assembly 18 relative to the bicycle frame BF about the rotational center axis A1. The bicycle chain 16 is engaged with the bicycle front sprocket 14 and the bicycle sprocket assembly 12 to transmit a driving rotational force F1 between the bicycle front sprocket 14 and the bicycle sprocket assembly 12. The bicycle front sprocket 14 comprised a solitary bicycle front sprocket. In this embodiment, the bicycle sprocket assembly 12 is a bicycle rear sprocket assembly. However, the structure of the bicycle sprocket assembly 12 can be applied to a front sprocket assembly in a case where the front sprocket assembly includes at least two front sprockets. A total number of the bicycle front sprocket 14 is not limited to this embodiment.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 12, should be interpreted relative to the bicycle equipped with the bicycle sprocket assembly 12 as used in an upright riding position on a horizontal surface.

Figure 2:
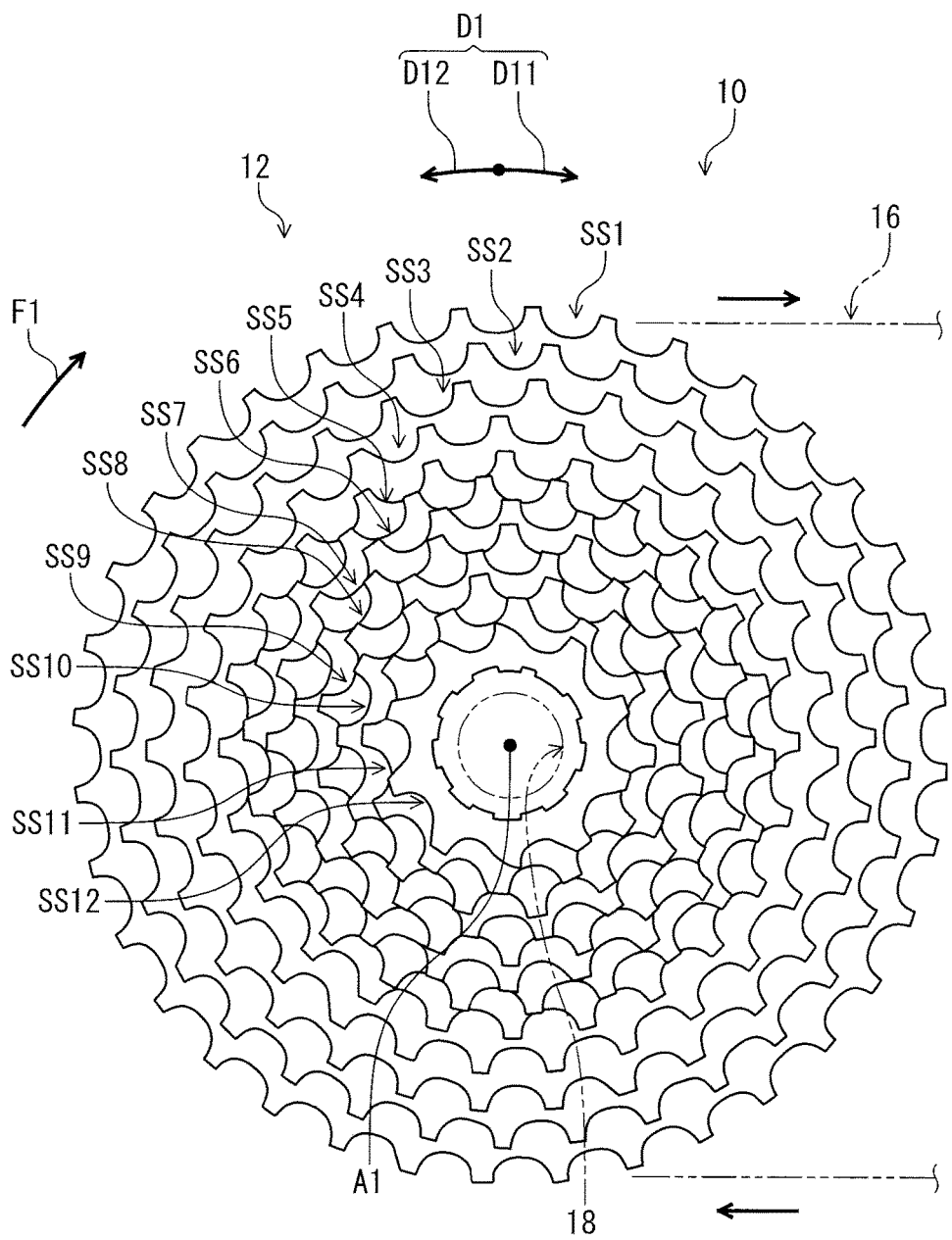
FIG. 2 is a side elevational view of a bicycle sprocket assembly of the bicycle drive train illustrated in FIG. 1.

As seen in FIG. 2, the bicycle sprocket assembly 12 is engaged with the bicycle chain 16 to transmit the driving rotational force F1 between the bicycle sprocket assembly 12 and the bicycle front sprocket 14 (FIG. 1). The bicycle sprocket assembly 12 is rotatable about the rotational center axis A1 in a driving rotational direction D11 during pedaling. A reverse rotational direction D12 is opposite to the driving rotational direction D11. The driving rotational direction D11 and the reverse rotational direction D12 extend along a circumferential direction D1 of the bicycle sprocket assembly 12.

The bicycle sprocket assembly 12 comprises bicycle rear sprockets SS1 to SS12. Each of the bicycle rear sprockets SS1 to SS12 is engageable with the bicycle chain 16. The bicycle rear sprockets SS1 to SS12 respectively have first to twelfth speed stages of the bicycle drive train 10. The bicycle rear sprocket SS1 corresponds to the first speed stage (i.e., low gear) of the bicycle sprocket assembly 12 and has a largest pitch-circle diameter among the bicycle rear sprockets SS1 to SS12. The bicycle rear sprocket SS12 corresponds to the twelfth speed stage (i.e., top gear) of the bicycle sprocket assembly 12 and has a smallest pitch-circle diameter among the bicycle rear sprockets SS1 to SS12. A total number of bicycle rear sprockets of the bicycle sprocket assembly 12 is not limited to this embodiment.

Figure 3:
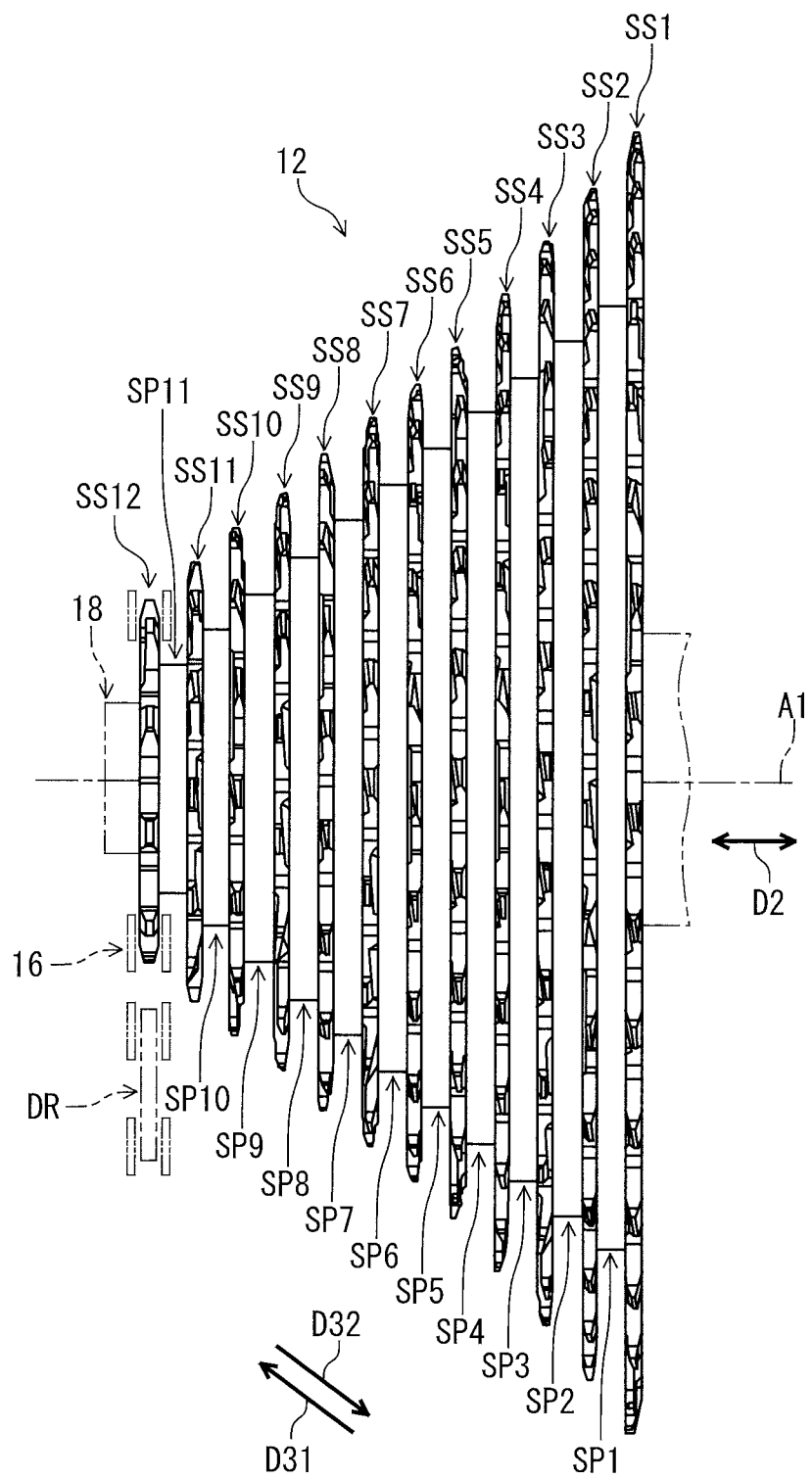
FIG. 3 is a front view of the bicycle sprocket assembly illustrated in FIG. 2.

As seen in FIG. 3, the bicycle sprocket assembly 12 further comprises spacers SP1 to SP11. The spacers SP1 to SP11 are respectively provided between adjacent two sprockets of the bicycle rear sprockets SS1 to SS12 in the axial direction D2. However, at least one of the spacers SP1 to SP11 can be omitted from the bicycle sprocket assembly 12.

In the bicycle sprocket assembly 12, an upshift occurs when the bicycle chain 16 is moved from a large sprocket to the next small sprocket by a derailleur DR in an upshifting direction D31. In the bicycle sprocket assembly 12, a downshift occurs when the bicycle chain 16 is moved from a small sprocket to the next large sprocket in a downshifting direction D32.

The bicycle rear sprocket SS8 will be described in detail below. In the following description, the bicycle rear sprocket SS9 is referred to as a smaller rear sprocket SS9. The bicycle rear sprockets SS1 to SS7 and SS9 to SS12 have substantially the same structure as that of the bicycle rear sprocket SS8. Thus, they will not be described in detail here for the sake of brevity.

Figure 4:
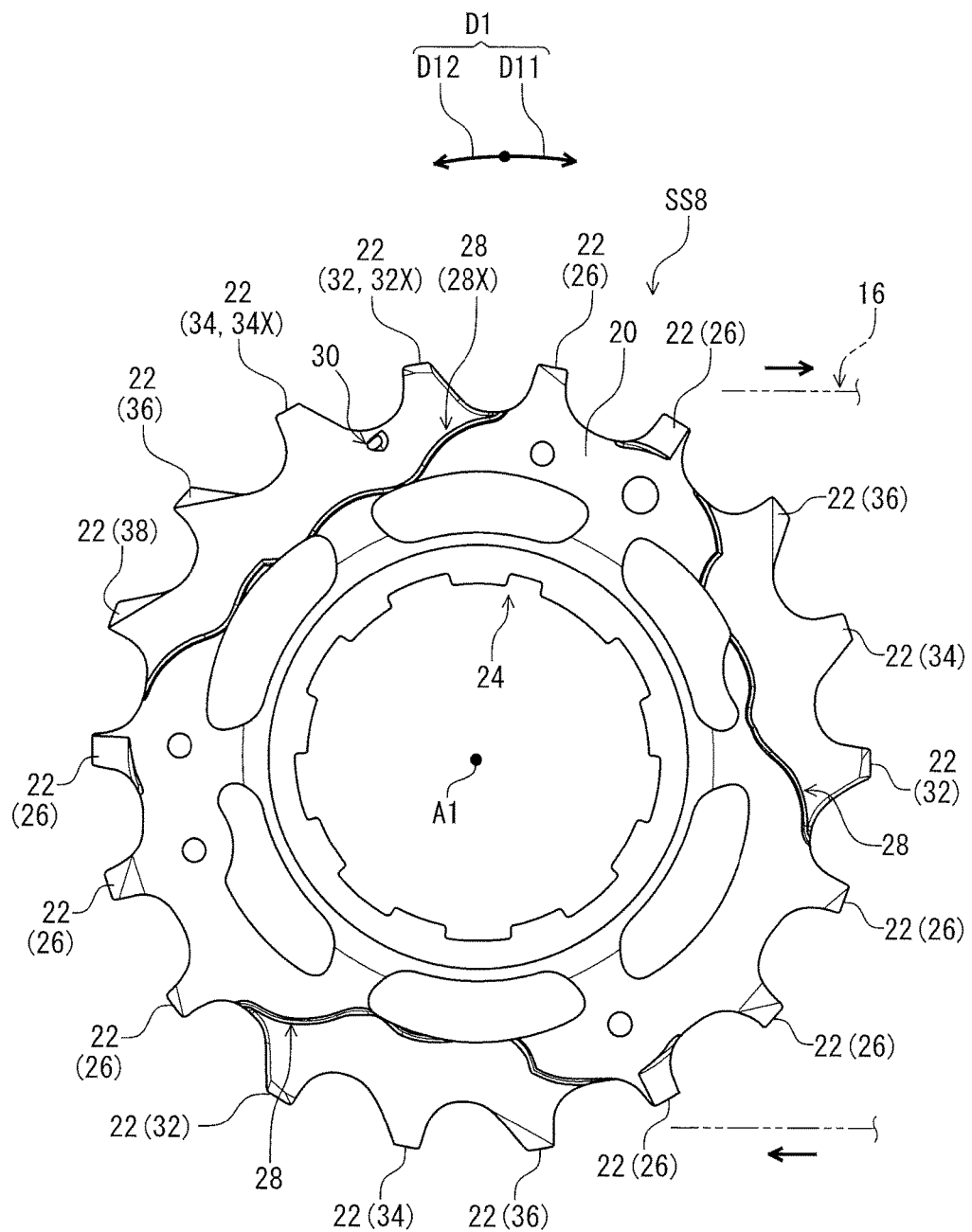
FIG. 4 is a side elevational view of the bicycle rear sprocket of the bicycle sprocket assembly illustrated in FIG. 2.

As seen in FIG. 4, the bicycle rear sprocket SS8 comprises a sprocket body 20 and a plurality of sprocket teeth 22 extending radially outwardly from the sprocket body 20. The sprocket body 20 includes a hub engagement structure 24 to engage with the bicycle rear hub assembly 18. The plurality of sprocket teeth 22 includes at least one driving tooth 26. In this embodiment, the plurality of sprocket teeth 22 includes a plurality of driving teeth 26. The driving tooth 26 is engageable with the bicycle chain 16 to transmit the driving rotational force F1 between the bicycle rear sprocket SS8 and the bicycle chain 16. A total number of the sprocket teeth 22 is 18. However, the total number of the sprocket teeth 22 is not limited to this embodiment.

As seen in FIG. 4, the bicycle rear sprocket SS8 comprises a shifting facilitation recess 28 to facilitate a shifting operation in which the bicycle chain 16 (FIG. 3) is shifted between the bicycle rear sprocket SS8 and the smaller rear sprocket SS9 (FIG. 3) adjacent to the bicycle rear sprocket SS8 without another sprocket between the bicycle rear sprocket SS8 and the smaller rear sprocket SS9 (FIG. 3). In this embodiment, the bicycle rear sprocket SS8 comprises a plurality of shifting facilitation recesses 28. However, a total number of the shifting facilitation recesses 28 is not limited to this embodiment. The shifting facilitation recess 28 is provided on the sprocket body 20 to facilitate the shifting operation.

Figure 5:
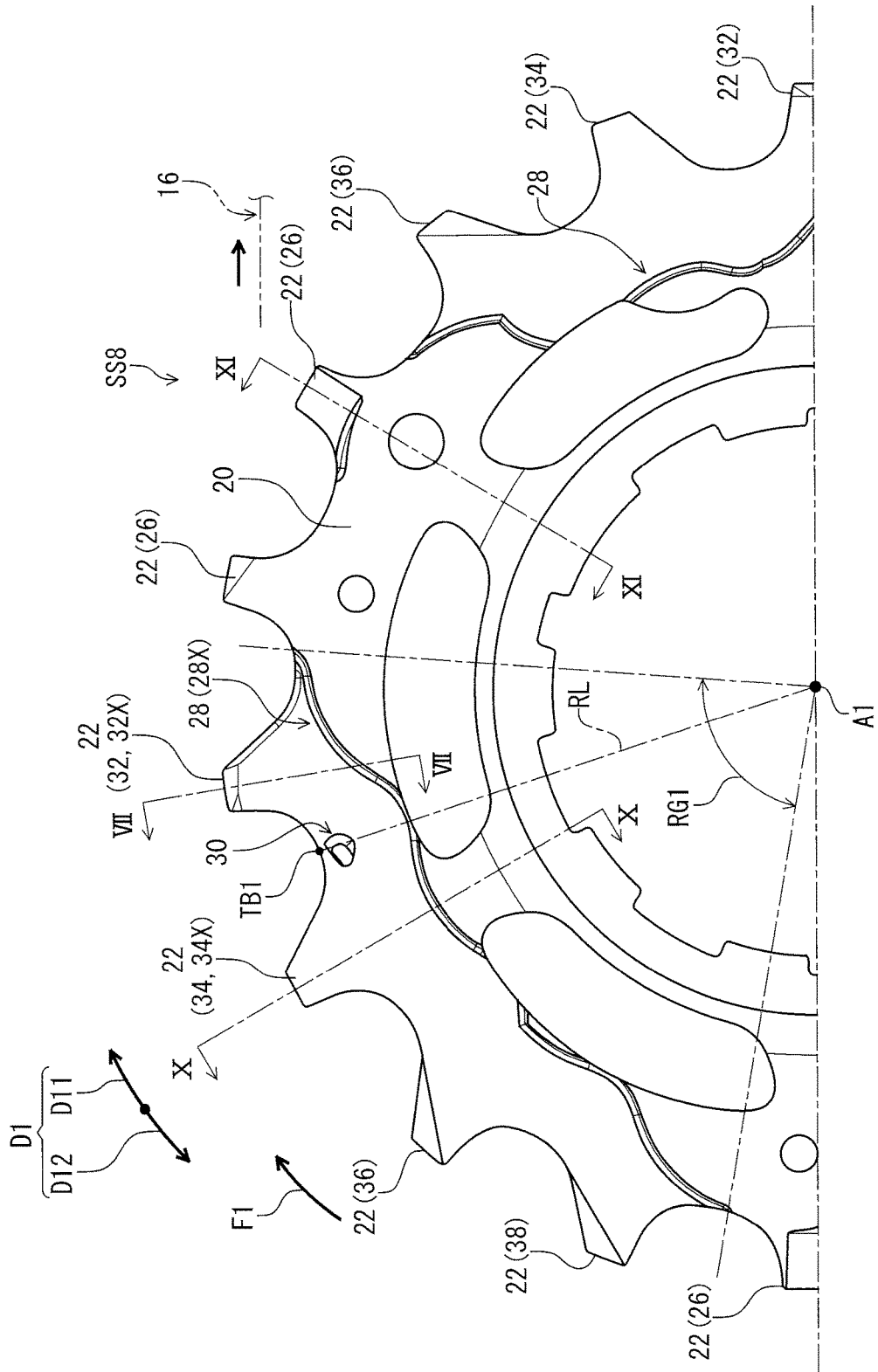
FIG. 5 is a partial side elevational view of the bicycle rear sprocket illustrated in FIG. 4.

As seen in FIG. 5, the bicycle rear sprocket SS8 comprises an upshifting facilitation projection 30 provided in the shifting facilitation recess 28 to support the bicycle chain 16 in an upshifting operation in which the bicycle chain 16 is shifted from the bicycle rear sprocket SS8 to the smaller rear sprocket SS9. A total number of the upshifting facilitation projection 30 is not limited to this embodiment. The bicycle rear sprocket SS8 can comprise a plurality of upshifting facilitation projections 30.

The plurality of sprocket teeth 22 includes a first tooth 32 and a second tooth 34. The first tooth 32 and the second tooth 34 are provided in an angular range RG1 of the shifting facilitation recess 28. The upshifting facilitation projection 30 is provided between the first tooth 32 and the second tooth 34 in the circumferential direction D1 with respect to the rotational center axis A1 of the bicycle rear sprocket SS8.

In this embodiment, the first tooth 32 is engageable with the bicycle chain 16 to transmit the driving rotational force F1 between the bicycle rear sprocket SS8 and the bicycle chain 16. The second tooth 34 is engageable with the bicycle chain 16 to transmit the driving rotational force F1 between the bicycle rear sprocket SS8 and the bicycle chain 16. The second tooth 34 is provided on an upstream side of the first tooth 32 in the driving rotational direction D11. The second tooth 34 is adjacent to the first tooth 32 in the circumferential direction D1 without another tooth between the first tooth 32 and the second tooth 34.

The upshifting facilitation projection 30 is provided radially inwardly of a tooth bottom TB1 provided between the first tooth 32 and the second tooth 34. The upshifting facilitation projection 30 is provided on a reference line RL when viewed along the rotational center axis A1. The reference line RL extends from the rotational center axis A1 to the tooth bottom TB1.

As seen in FIG. 5, the plurality of sprocket teeth 22 includes a third tooth 36 and a fourth tooth 38. The third tooth 36 and the fourth tooth 38 are provided in the angular range RG1 of the shifting facilitation recess 28. The third tooth 36 is engageable with the bicycle chain 16 to transmit the driving rotational force F1 between the bicycle rear sprocket SS8 and the bicycle chain 16. The fourth tooth 38 is engageable with the bicycle chain 16 to transmit the driving rotational force F1 between the bicycle rear sprocket SS8 and the bicycle chain 16. The fourth tooth 38 is provided on an upstream side of the third tooth 36 in the driving rotational direction D11. The fourth tooth 38 is adjacent to the third tooth 36 in the circumferential direction D1 without another tooth between the third tooth 36 and the fourth tooth 38.

The third tooth 36 is provided on an upstream side of the second tooth 34 in the driving rotational direction D11. The third tooth 36 is adjacent to the second tooth 34 in the circumferential direction D1 without another tooth between the second tooth 34 and the third tooth 36. At least one of the third tooth 36 and the fourth tooth 38 can be omitted from the sprocket teeth 22.

Figure 6:
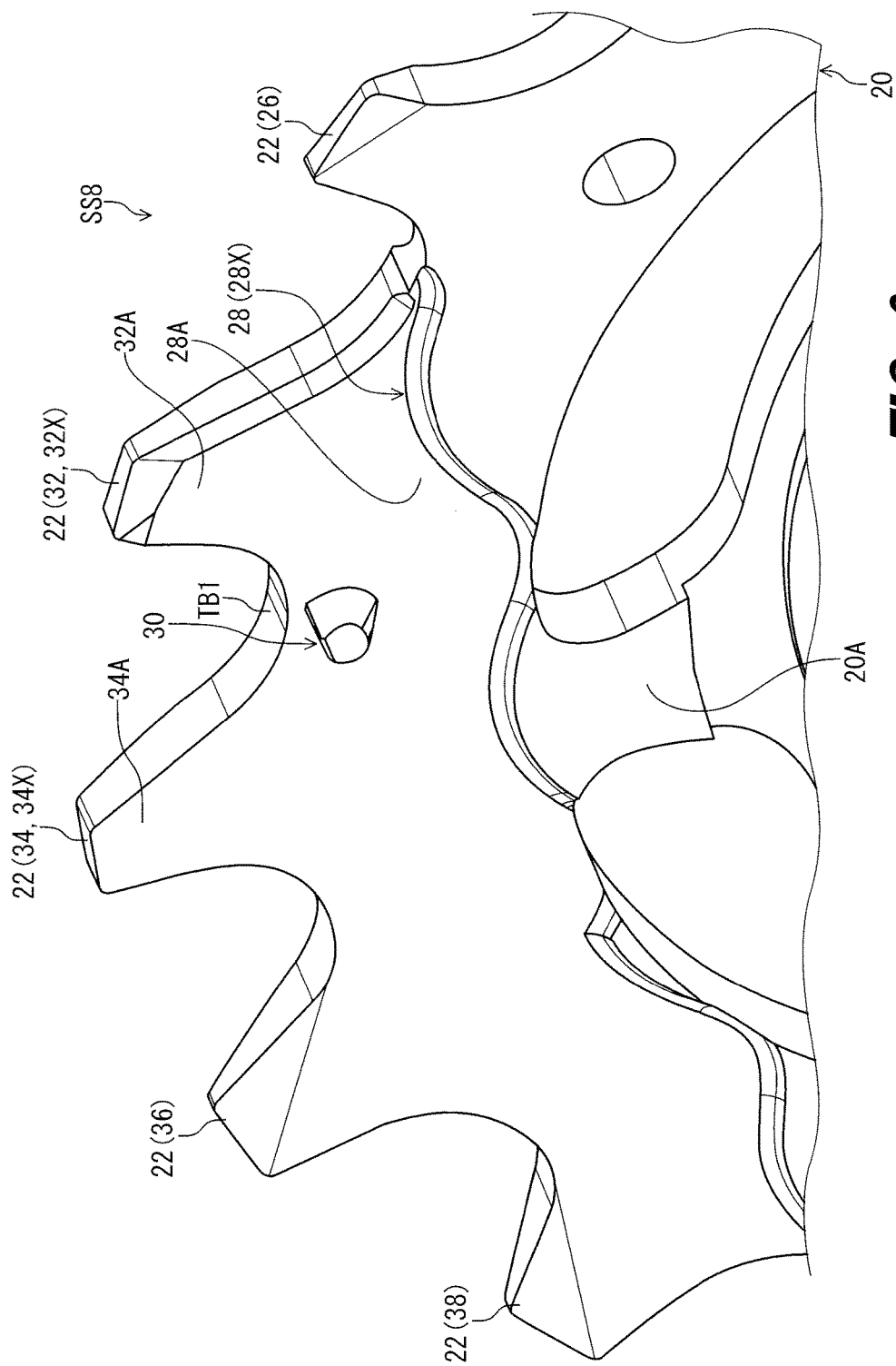
FIG. 6 is a partial perspective view of the bicycle rear sprocket illustrated in FIG. 4.

As seen in FIG. 6, the shifting facilitation recess 28 is continuously provided between the first tooth 32 and the second tooth 34 through the upshifting facilitation projection 30. In this embodiment, the shifting facilitation recess 28 is continuously provided between the first tooth 32 and the fourth tooth 38 through the upshifting facilitation projection 30 in the circumferential direction D1.

Figure 7:
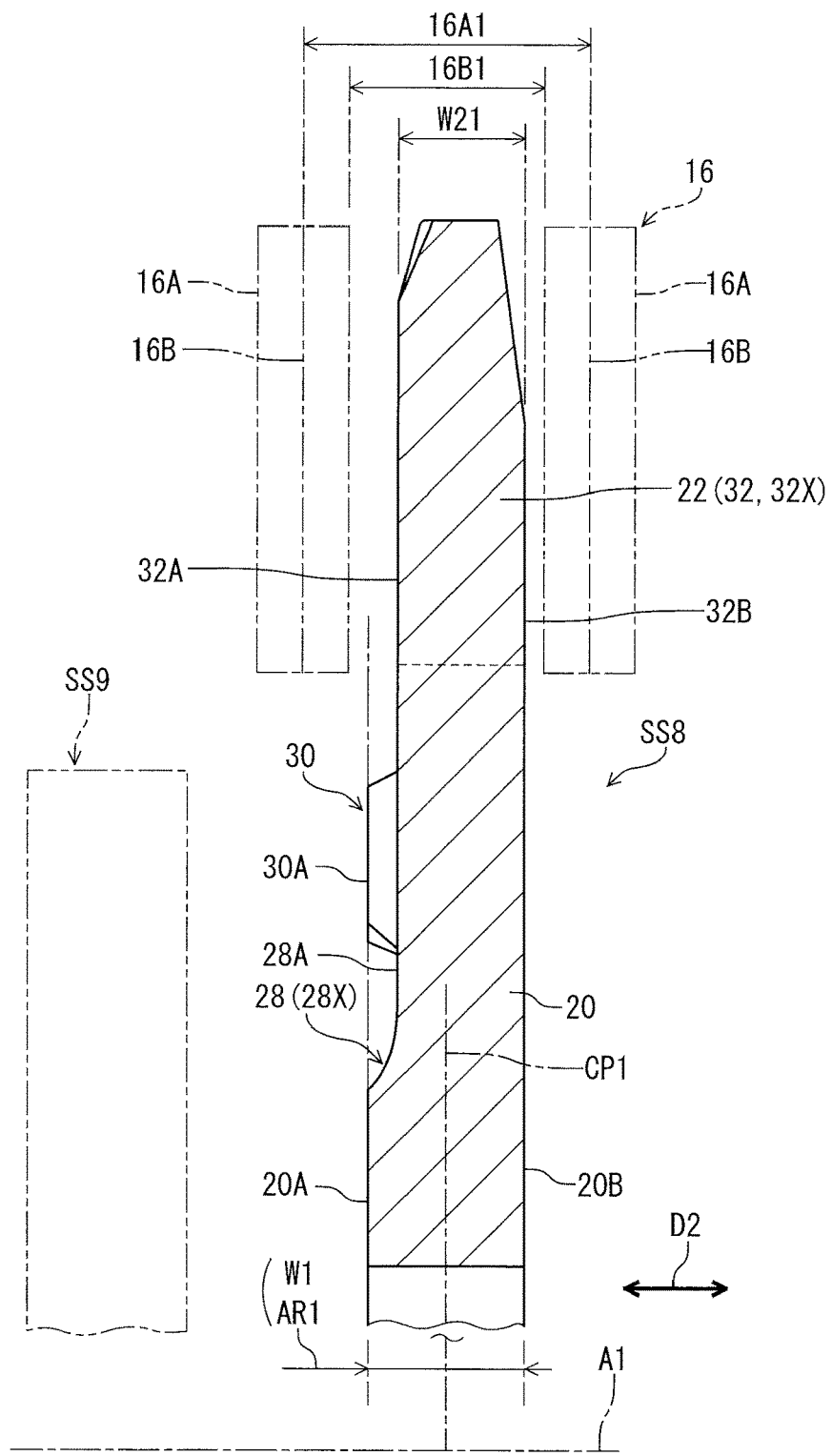
FIG. 7 is a cross-sectional view of the bicycle rear sprocket taken along line VII-VII of FIG. 5.

As seen in FIG. 7, the sprocket body 20 includes a first axial surface 20A and a second axial surface 20B provided on a reverse side of the first axial surface 20A in the axial direction D2 with respect to the rotational center axis A1 of the bicycle rear sprocket SS8. The first axial surface 20A faces toward the smaller rear sprocket SS9 in the axial direction D2. The second axial surface 20B faces toward an opposite side of the smaller rear sprocket SS9 in the axial direction D2. The sprocket body 20 has a sprocket center plane CP1 perpendicular to the rotational center axis A1 of the bicycle rear sprocket SS8. The sprocket center plane CP1 bisects the bicycle rear sprocket SS8 in the axial direction D2 with respect to the rotational center axis A1. The sprocket body 20 has a maximum axial width W1 defined between the first axial surface 20A and the second axial surface 20B in the axial direction D2. The sprocket center plane CP1 bisects the maximum axial width W1.

The shifting facilitation recess 28 is provided on the first axial surface 20A to facilitate the shifting operation. The shifting facilitation recess 28 includes a side surface 28A. The side surface 28A faces toward the smaller rear sprocket SS9 in the axial direction D2. The side surface 28A is offset from the first axial surface 20A toward the second axial surface 20B in the axial direction D2. The side surface 28A is provided between the first axial surface 20A and the sprocket center plane CP1 in the axial direction D2.

As seen in FIG. 7, the first tooth 32 includes a first surface 32A and a first additional surface 32B. The first surface 32A faces toward the smaller rear sprocket SS9 in the axial direction D2. The first surface 32A is offset from the first axial surface 20A toward the second axial surface 20B in the axial direction D2. The first surface 32A is provided at the same axial position as an axial position of the side surface 28A. The first additional surface 32B faces toward an opposite side of the smaller rear sprocket SS9 in the axial direction D2. The first additional surface 32B is provided at the same axial position as an axial position of the second axial surface 20B.

The first tooth 32 has a first maximum axial width W21. The first maximum axial width W21 is provided between the first surface 32A and the first additional surface 32B in the axial direction D2. The bicycle chain 16 includes an opposed pair of outer link plates 16A and an opposed pair of inner link plates 16B. The first tooth 32 is engageable in an outer link space 16A1 provided between the opposed pair of outer link plates 16A. The first tooth 32 is engageable in an inner link space 16B1 provided between the opposed pair of inner link plates 16B.

Figure 8:
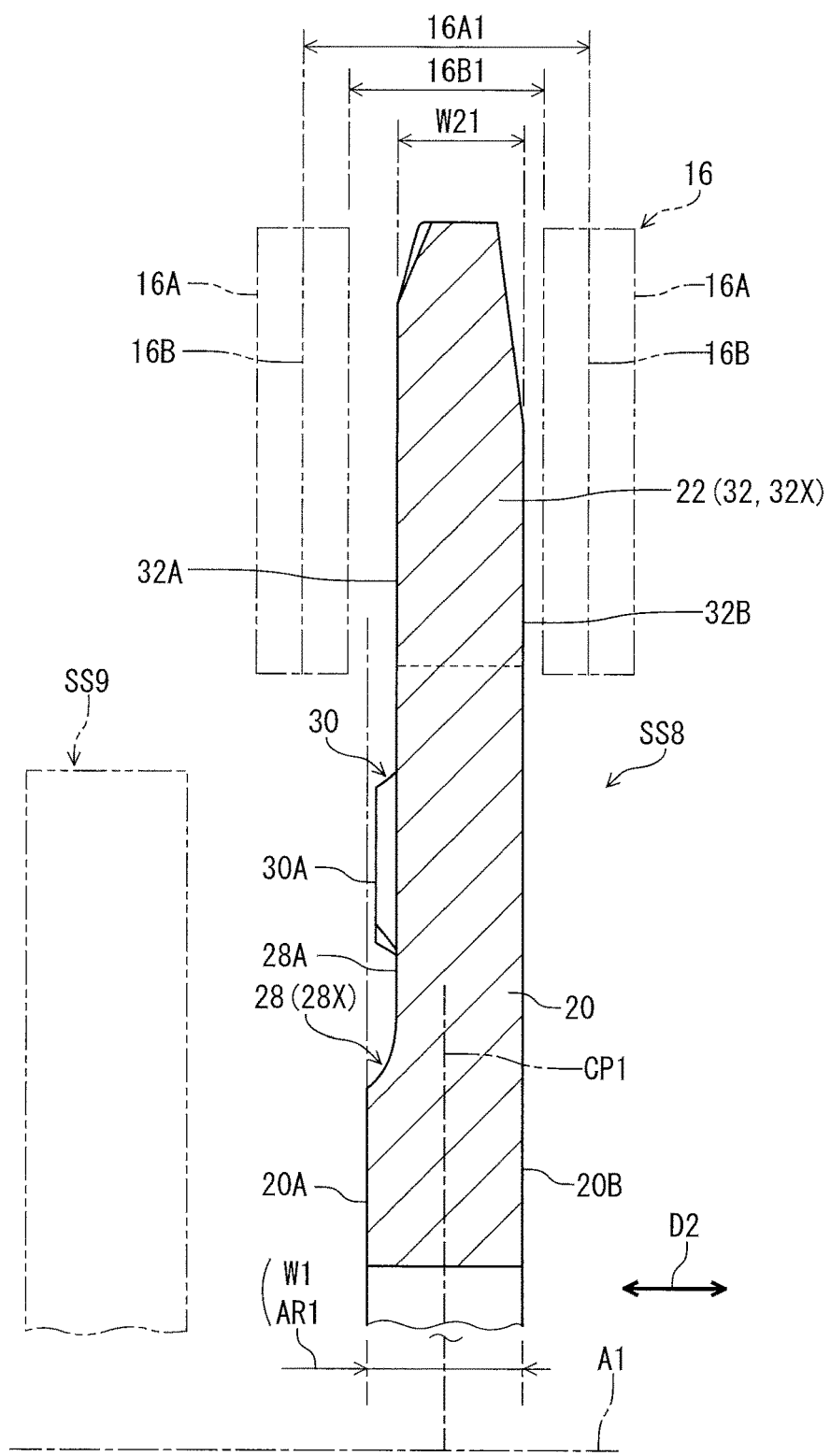
FIG. 8 is a cross-sectional view of the bicycle rear sprocket taken along line VII-VII of FIG. 5 (modification).
Figure 9:
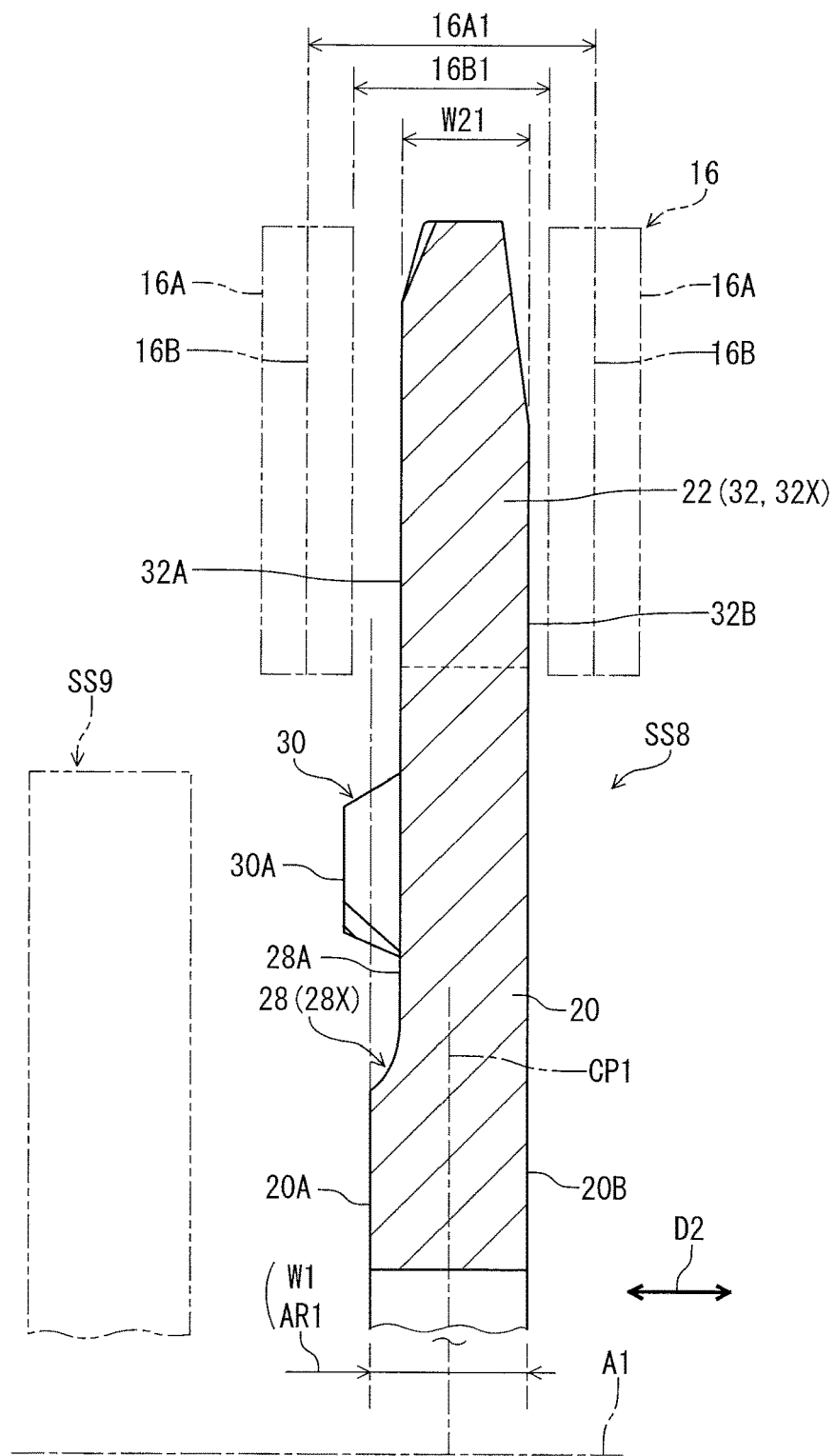
FIG. 9 is a cross-sectional view of the bicycle rear sprocket taken along line VII-VII of FIG. 5 (another modification).

An axial end 30A of the upshifting facilitation projection 30 is provided in an axial area AR1 extending from the first axial surface 20A to the second axial surface 20B. In this embodiment, the axial end 30A of the upshifting facilitation projection 30 is provided at the same axial position as the axial position of the first axial surface 20A in the axial direction D2. As seen in FIG. 8, however, the axial end 30A of the upshifting facilitation projection 30 can be provided closer to the second axial surface 20B than the first axial surface 20A in the axial direction D2. As seen in FIG. 9, the axial end 30A of the upshifting facilitation projection 30 can be provided outside the axial area AR1.

Figure 10:
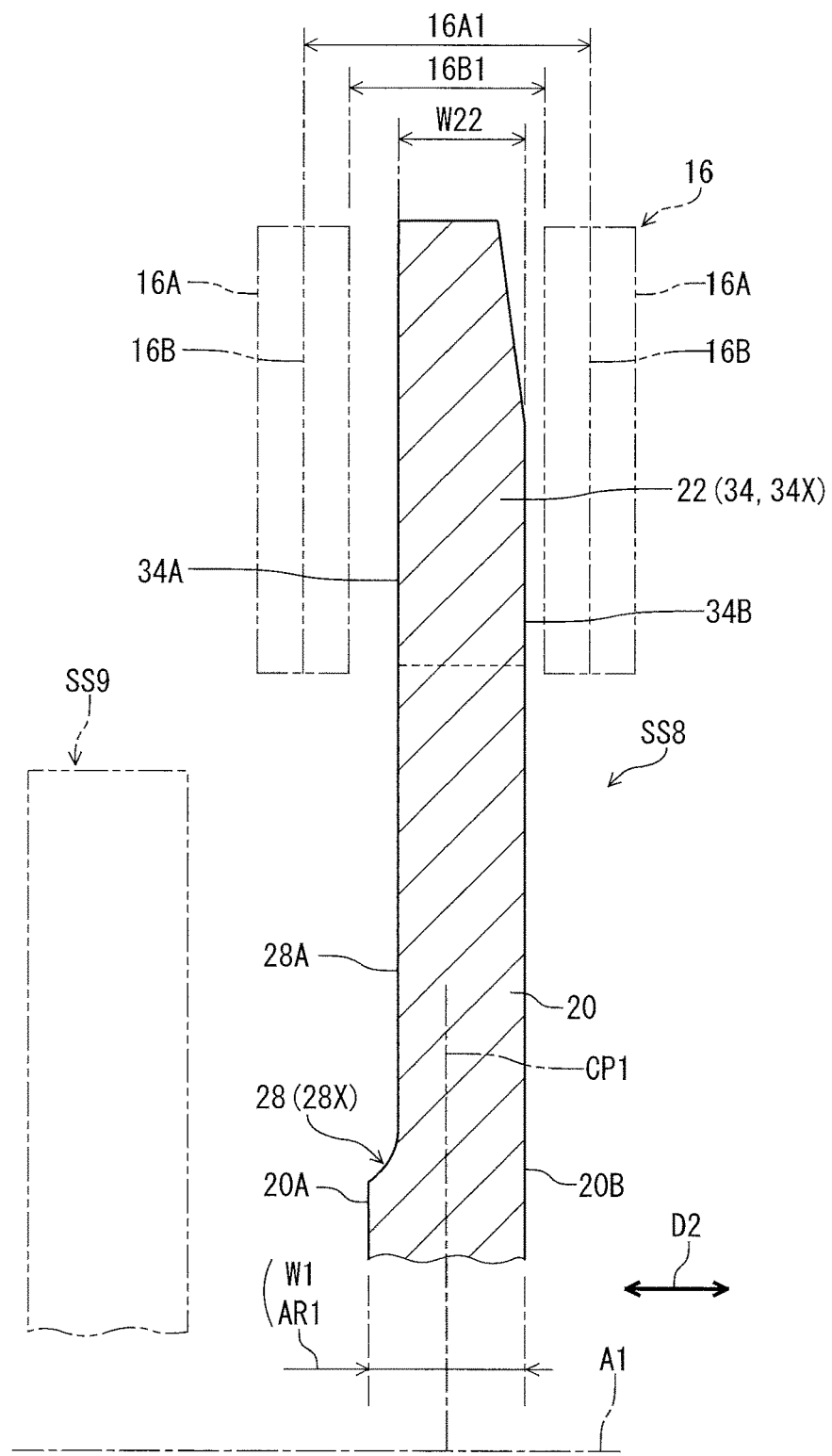
FIG. 10 is a cross-sectional view of the bicycle rear sprocket taken along line X-X of FIG. 5.

As seen in FIG. 10, the second tooth 34 includes a second surface 34A and a second additional surface 34B. The second surface 34A faces toward the smaller rear sprocket SS9 in the axial direction D2. The second surface 34A is offset from the first axial surface 20A toward the second axial surface 20B in the axial direction D2. The second surface 34A is provided at the same axial position as an axial position of the side surface 28A. The second additional surface 34B faces toward an opposite side of the smaller rear sprocket SS9 in the axial direction D2. The second additional surface 34B is provided at the same axial position as an axial position of the second axial surface 20B.

The second tooth 34 has a second maximum axial width W22. The second maximum axial width W22 is provided between the second surface 34A and the second additional surface 34B in the axial direction D2. The second tooth 34 is engageable in the outer link space 16A1. The second tooth 34 is engageable in the inner link space 16B1.

Figure 11:
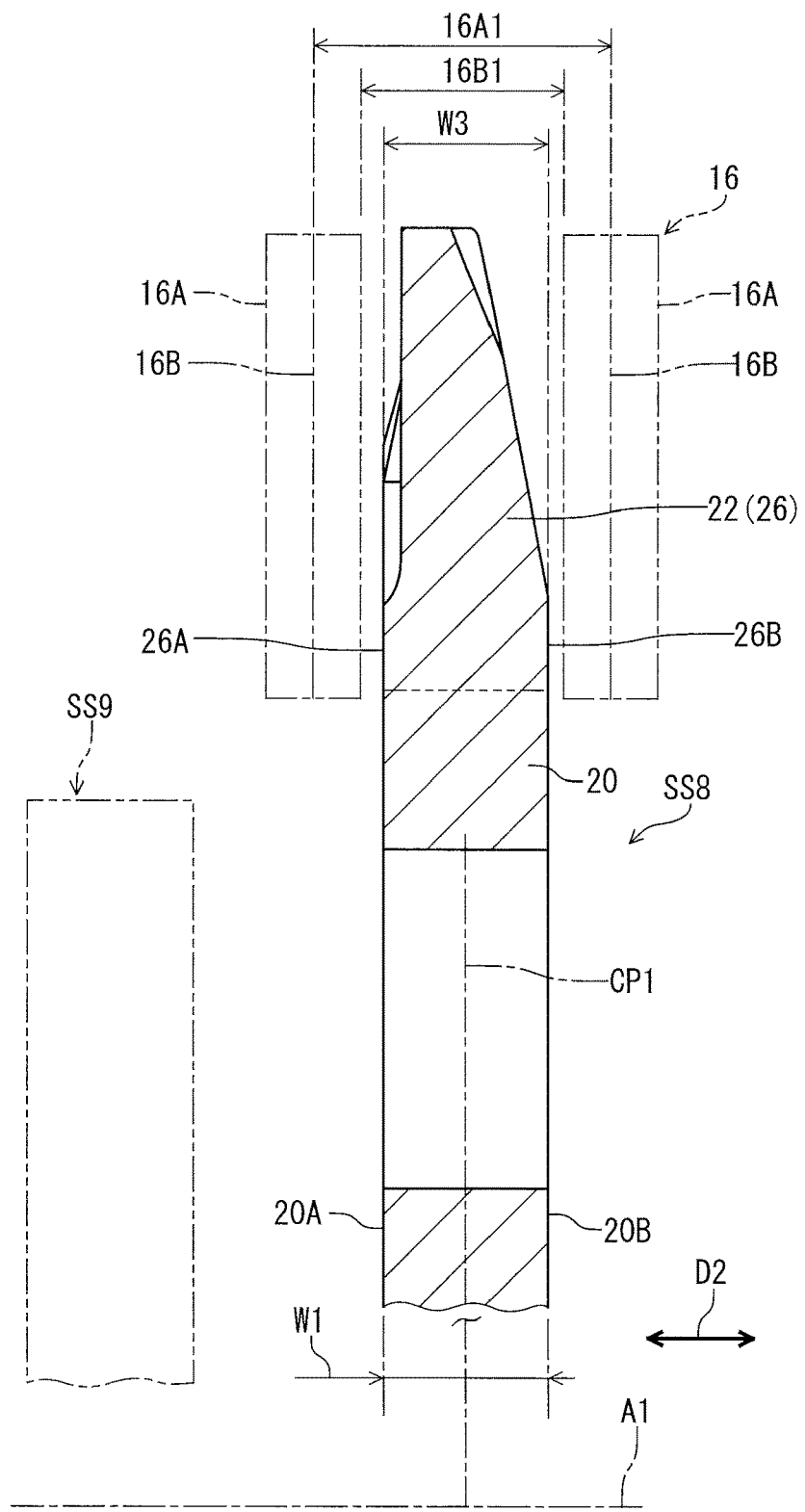
FIG. 11 is a cross-sectional view of the bicycle rear sprocket taken along line XI-XI of FIG. 5.

As seen in FIG. 11, the driving tooth 26 includes a tooth surface 26A and an additional tooth surface 26B. The tooth surface 26A faces toward the smaller rear sprocket SS9 in the axial direction D2. The tooth surface 26A is provided at the same axial position as an axial position of the first axial surface 20A. The additional tooth surface 26B faces toward an opposite side of the smaller rear sprocket SS9 in the axial direction D2. The additional tooth surface 26B is provided at the same axial position as an axial position of the second axial surface 20B. Namely, the driving tooth 26 has a maximum axial width W3 equal to the maximum axial width W1 of the sprocket body 20.

The third tooth 36 and the fourth tooth 38 have substantially the same structure as that of the first tooth 32 or the second tooth 34. Thus, they will not be described in detail here for the sake of brevity.

As seen in FIG. 4, the bicycle rear sprocket SS8 comprises a plurality of shifting facilitation recesses 28. The plurality of sprocket teeth 22 includes a plurality of first teeth 32, a plurality of second teeth 34, and a plurality of third teeth 36. The first tooth 32, the second tooth 34, and the third tooth 36 are provided in each of the shifting facilitation recesses 28. The fourth tooth 38 is provided in one of the shifting facilitation recess 28 (the shifting facilitation recess 28X). However, a total number of the shifting facilitation recesses 28 is not limited to this embodiment. A total number of the first teeth 32 is not limited to this embodiment. A total number of the second teeth 34 is not limited to this embodiment. A total number of the third teeth 36 is not limited to this embodiment.

In this embodiment, the upshifting facilitation projection 30 is provided between one of the first teeth 32 (the first tooth 32X) and one of the second teeth 34 (the second tooth 34X) in the circumferential direction D1 with respect to the rotational center axis A1 of the bicycle rear sprocket SS8. However, the bicycle rear sprocket SS8 can comprises a plurality of upshifting facilitation projections 30, and another of the upshifting facilitation projection 30 can be provided in another of the shifting facilitation recesses 28.

Figure 12:
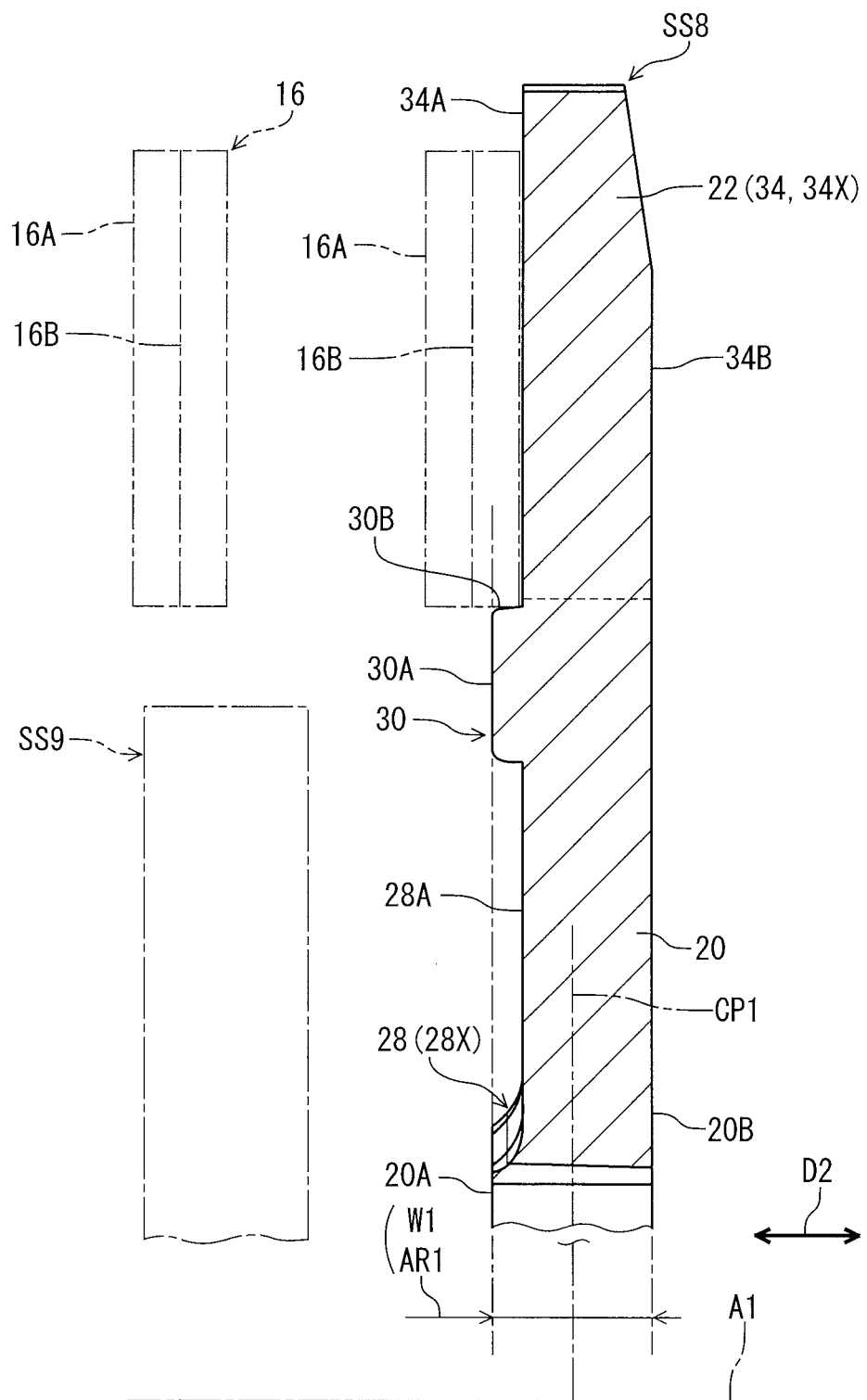
FIG. 12 is a cross-sectional view of the bicycle rear sprocket taken along line XII-XII of FIG. 14.
Figure 13:
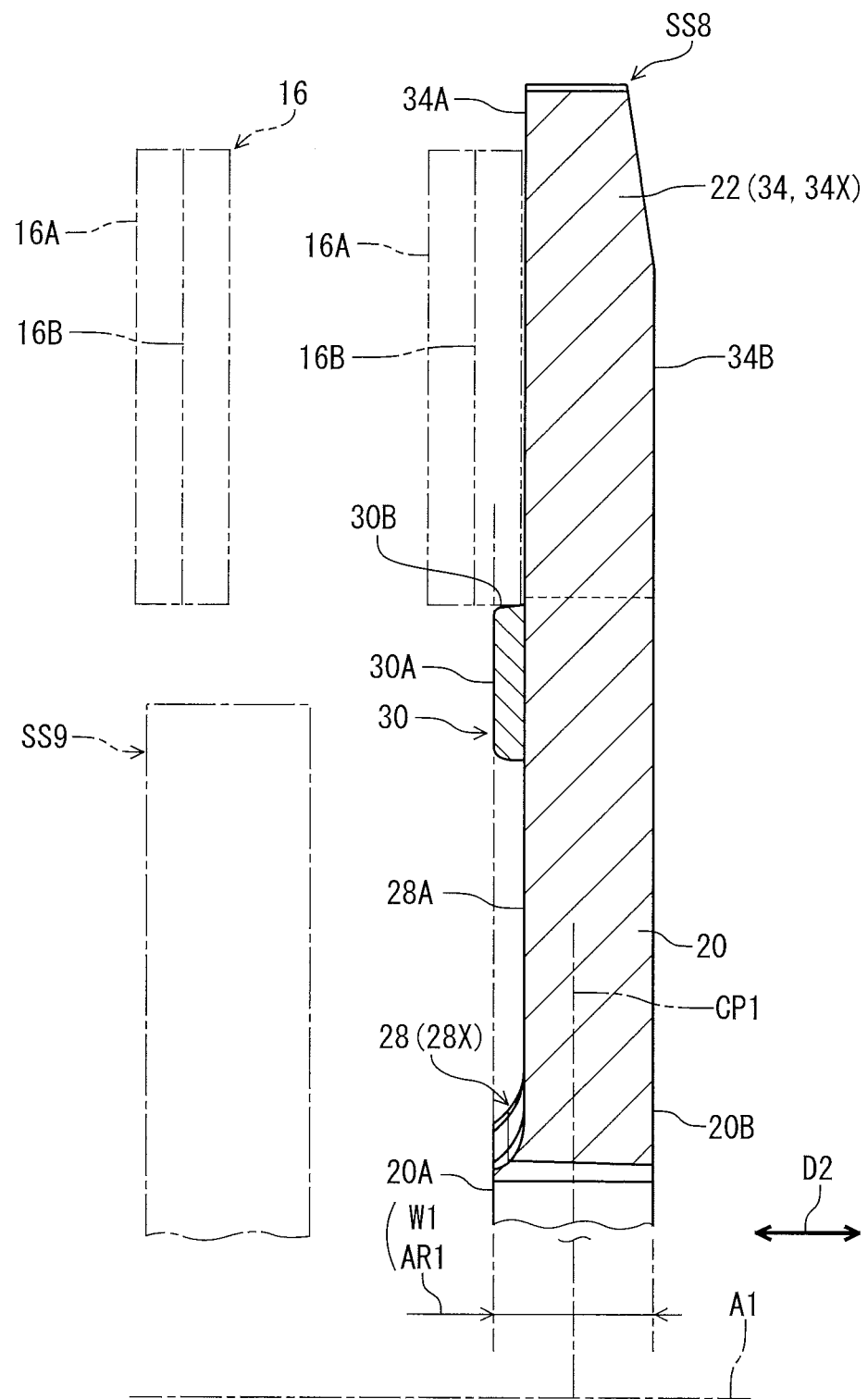
FIG. 13 is a cross-sectional view of the bicycle rear sprocket taken along line XII-XII of FIG. 14 (modification).

As seen in FIG. 12, the upshifting facilitation projection 30 extends from the side surface 28A of the shifting facilitation recess 28 in the axial direction D2. The upshifting facilitation projection 30 is integrally provided with the sprocket body 20 as a one-piece unitary member. As seen in FIG. 13, however, the upshifting facilitation projection 30 can be a separate member from the sprocket body 20. In this embodiment, the sprocket body 20 and the upshifting facilitation projection 30 are made of a metallic material such as iron, titanium, and aluminum.

As seen in FIG. 12, the upshifting facilitation projection 30 includes a chain contact surface 30B contactable with the bicycle chain 16 in the upshifting operation. The chain contact surface 30B extends from the side surface 28A of the shifting facilitation recess 28 in the axial direction D2. In this embodiment, the chain contact surface 30B is inclined relative to the sprocket center plane CP1 perpendicular to the rotational center axis A1 of the bicycle rear sprocket SS8. However, the chain contact surface 30B can be perpendicular to the sprocket center plane CP1.

Figure 14:
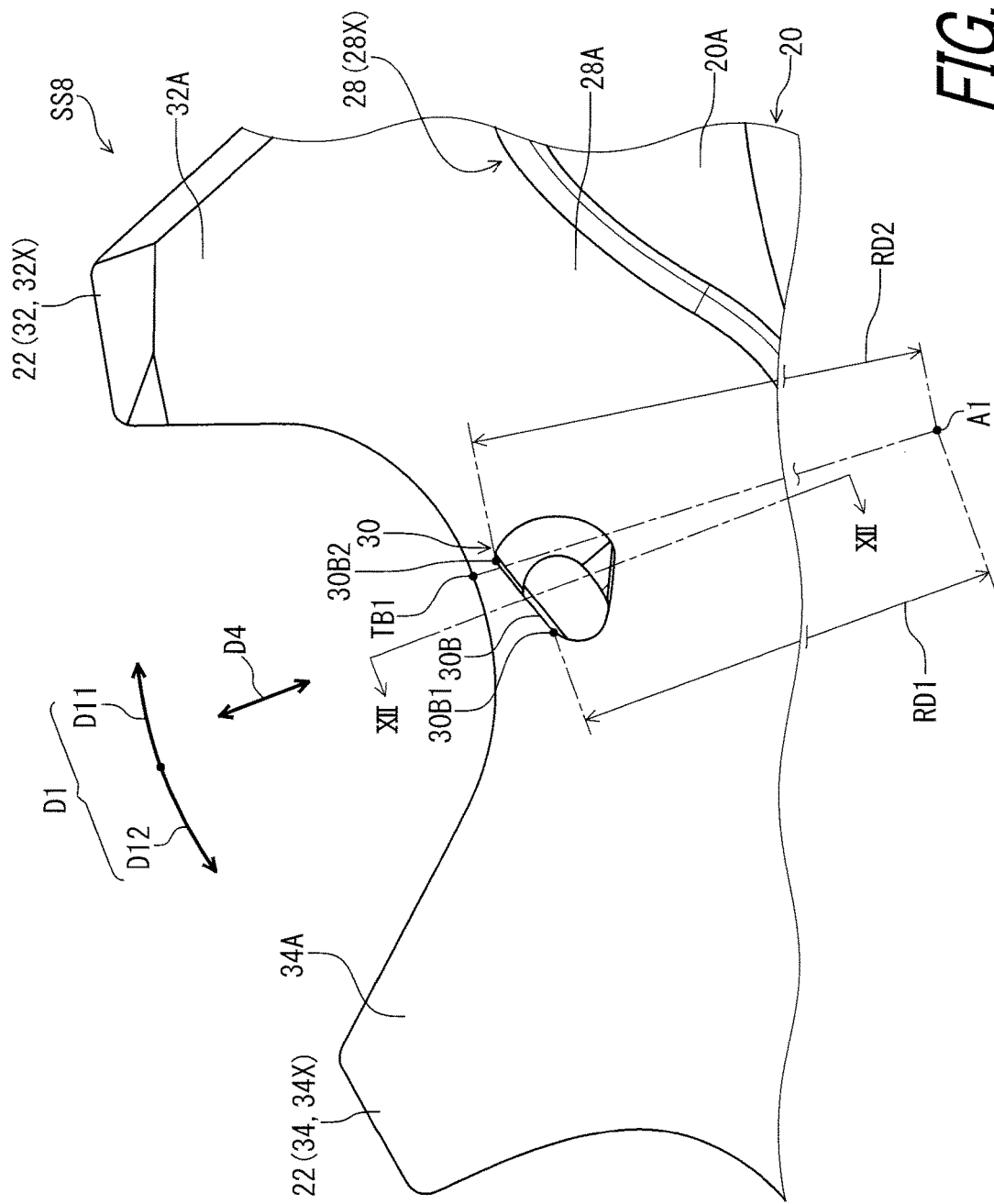
FIG. 14 is an enlarged partial side elevational view of the bicycle rear sprocket illustrated in FIG. 4.

As seen in FIG. 14, the chain contact surface 30B is inclined relative to a first radial direction D4 perpendicular to the rotational center axis A1 of the bicycle rear sprocket SS8. The first radial direction D4 extends from the rotational center axis A1 to the upshifting facilitation projection 30. In this embodiment, the first radial direction D4 is parallel to the reference line RL.

The chain contact surface 30B includes a first circumferential end 30B1 and a second circumferential end 30B2. The chain contact surface 30B extends between the first circumferential end 30B1 and the second circumferential end 30B2. In this embodiment, the first circumferential end 30B1 is provided on an upstream side of the second circumferential end 30B2 in the driving rotational direction D11 in which the bicycle rear sprocket SS8 is rotated about the rotational center axis A1 during pedaling.

As seen in FIG. 14, a first radial distance RD1 provided between the rotational center axis A1 of the bicycle rear sprocket SS8 and the first circumferential end 30B1 is different from a second radial distance RD2 provided between the rotational center axis A1 and the second circumferential end 30B2. The first radial distance RD1 is smaller than the second radial distance RD2. However, the first radial distance RD1 can be equal to or larger than the second radial distance RD2.

Figure 15:
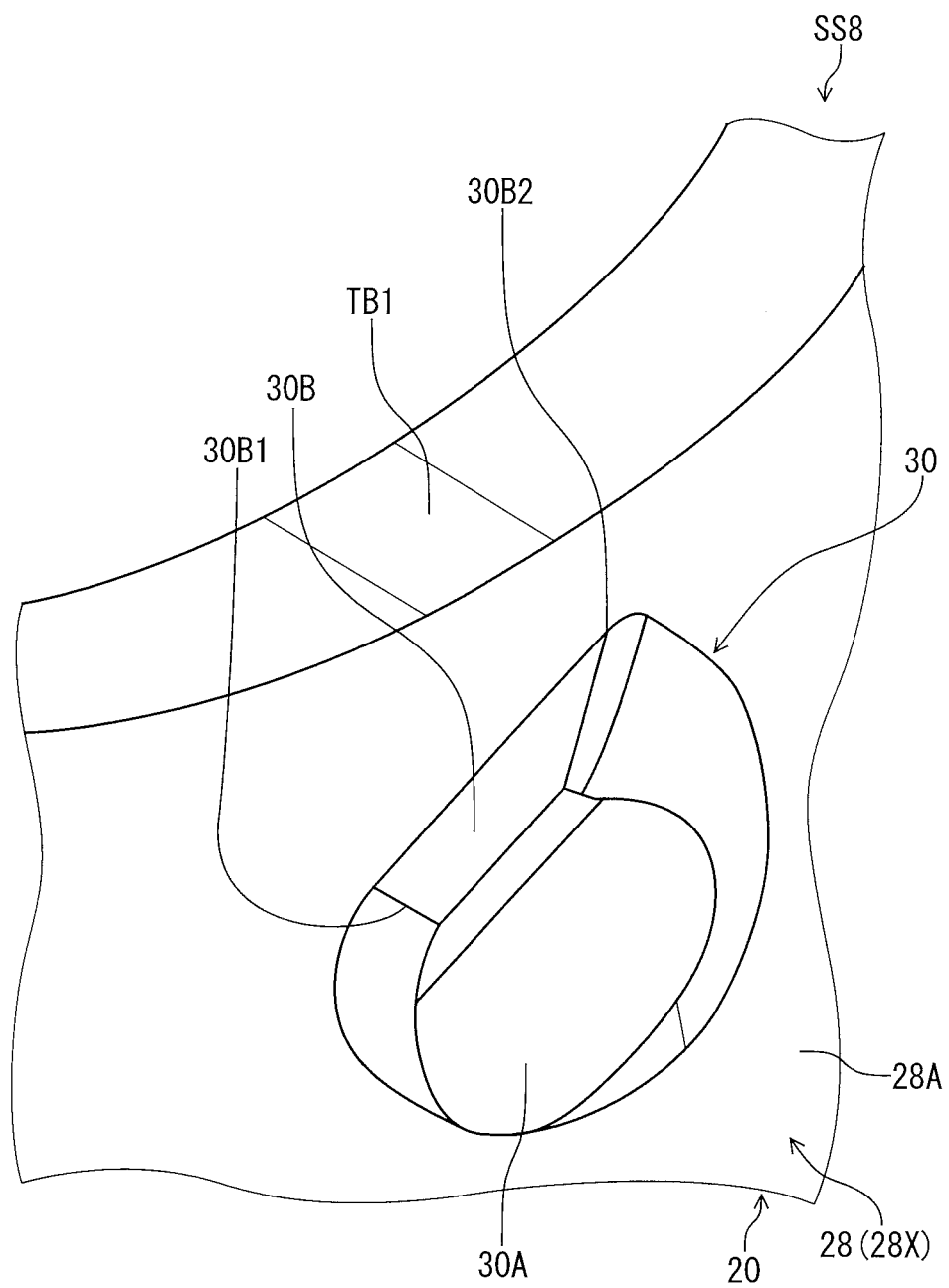
FIG. 15 is a partial perspective view of the bicycle rear sprocket illustrated in FIG. 4.

In this embodiment, as seen in FIG. 15, the chain contact surface 30B includes a flat surface. The axial end 30A includes a flat surface. However, at least one of the axial end 30A and the chain contact surface 30B can include a curved surface instead of or in addition to the flat surface.

Figure 16:
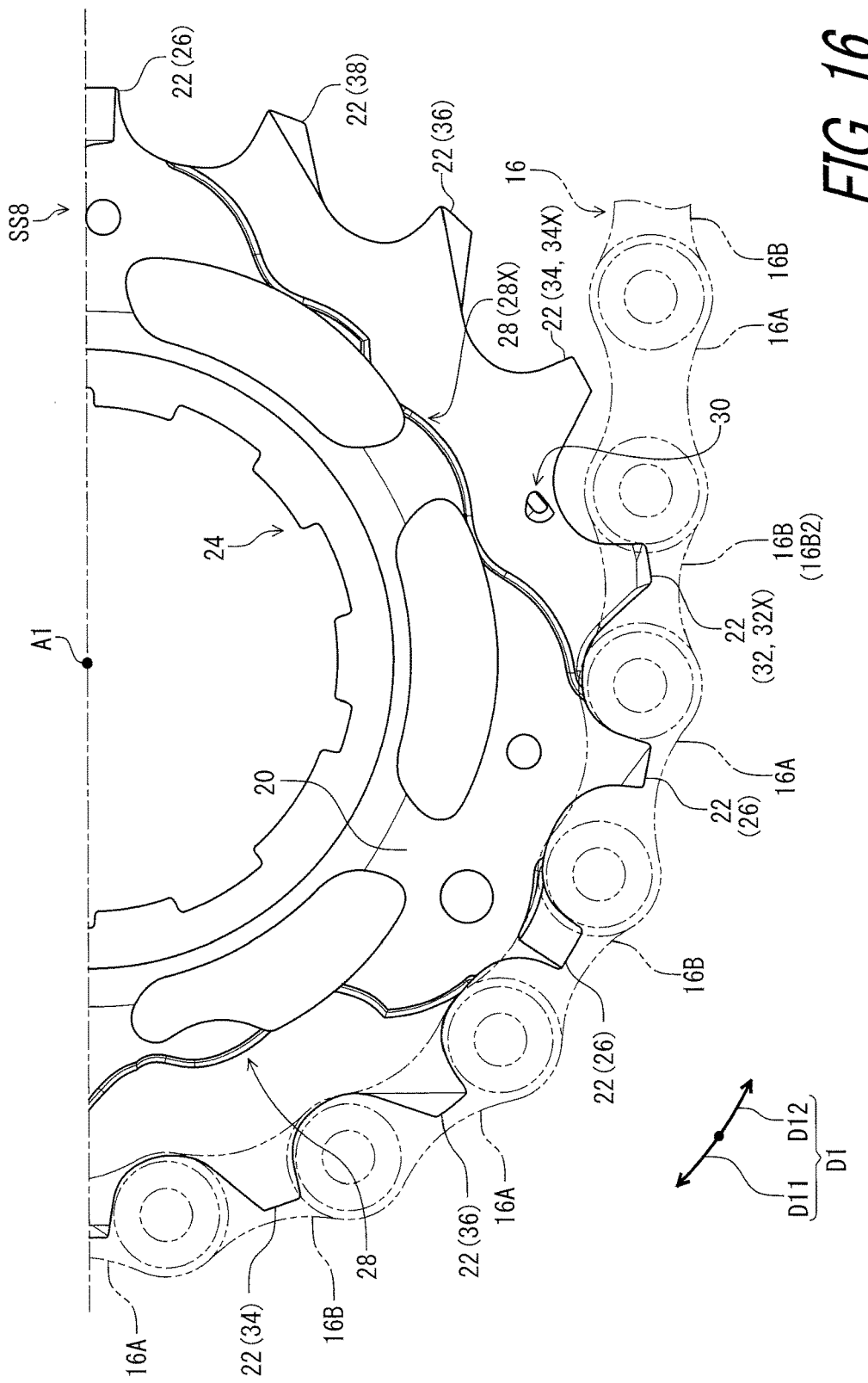
FIG. 16 is a partial perspective view of the bicycle rear sprocket illustrated in FIG. 4, with a bicycle chain.

As seen in FIG. 16, the bicycle chain 16 is shifted toward the smaller rear sprocket SS9 in the axial direction D2 by the derailleur DR in the upshifting operation. For example, the bicycle chain 16 (the opposed pair of inner link plates 16B2) is first derailed at the first tooth 32 from the bicycle rear sprocket SS8.

Figure 17:
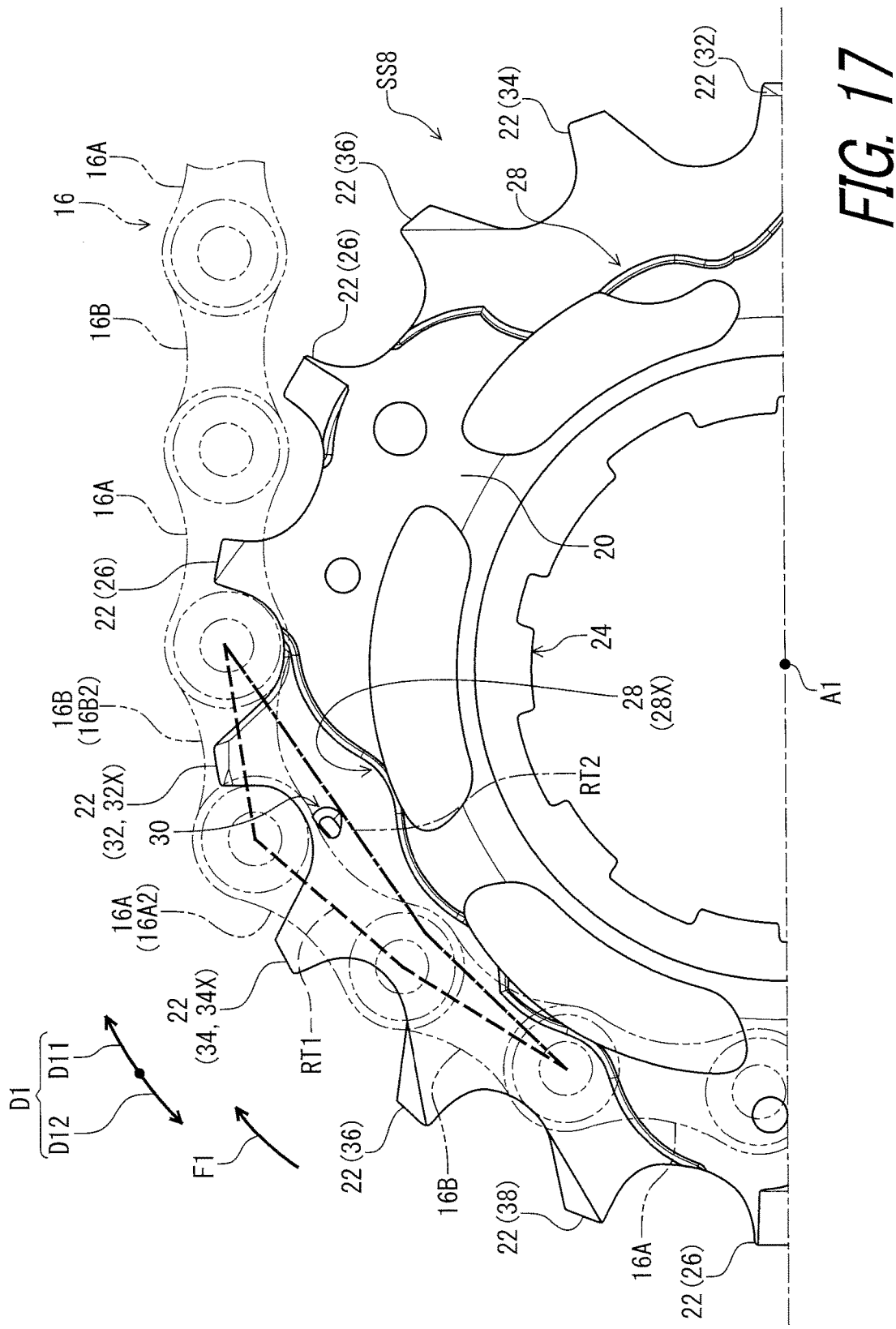
FIG. 17 is a partial perspective view of the bicycle rear sprocket illustrated in FIG. 4, with the bicycle chain.

As seen in FIG. 17, the outer link plate 16B2 of the bicycle chain 16 is lifted by the upshifting facilitation projection 30 when the bicycle rear sprocket SS8 further rotates in the driving rotational direction D11 after the inner link plates 16B2 is first derailed at the first tooth 32. The bicycle chain 16 extends along a route RT1 in a state where the outer link plate 16B2 of the bicycle chain 16 is lifted by the upshifting facilitation projection 30. The route RT1 is longer than a route RT2 along which the bicycle chain 16 extends without the upshifting facilitation projection 30. Thus, the upshifting facilitation projection 30 smoothly brings the bicycle chain 16 into engagement with the smaller rear sprocket SS9 in the upshifting operation in which the bicycle chain 16 is shifted from the bicycle rear sprocket SS8 to the smaller rear sprocket SS9.

Second Embodiment

A bicycle rear sprocket SS208 in accordance with a second embodiment will be described below referring to FIGS. 18 to 20. The bicycle rear sprocket SS208 has the same structure and/or configuration as those of the bicycle rear sprocket SS8 except for the driving tooth 26. Thus, elements having substantially the same function as those in the first embodiment will be numbered the same here, and will not be described and/or illustrated again in detail here for the sake of brevity.

Figure 18:
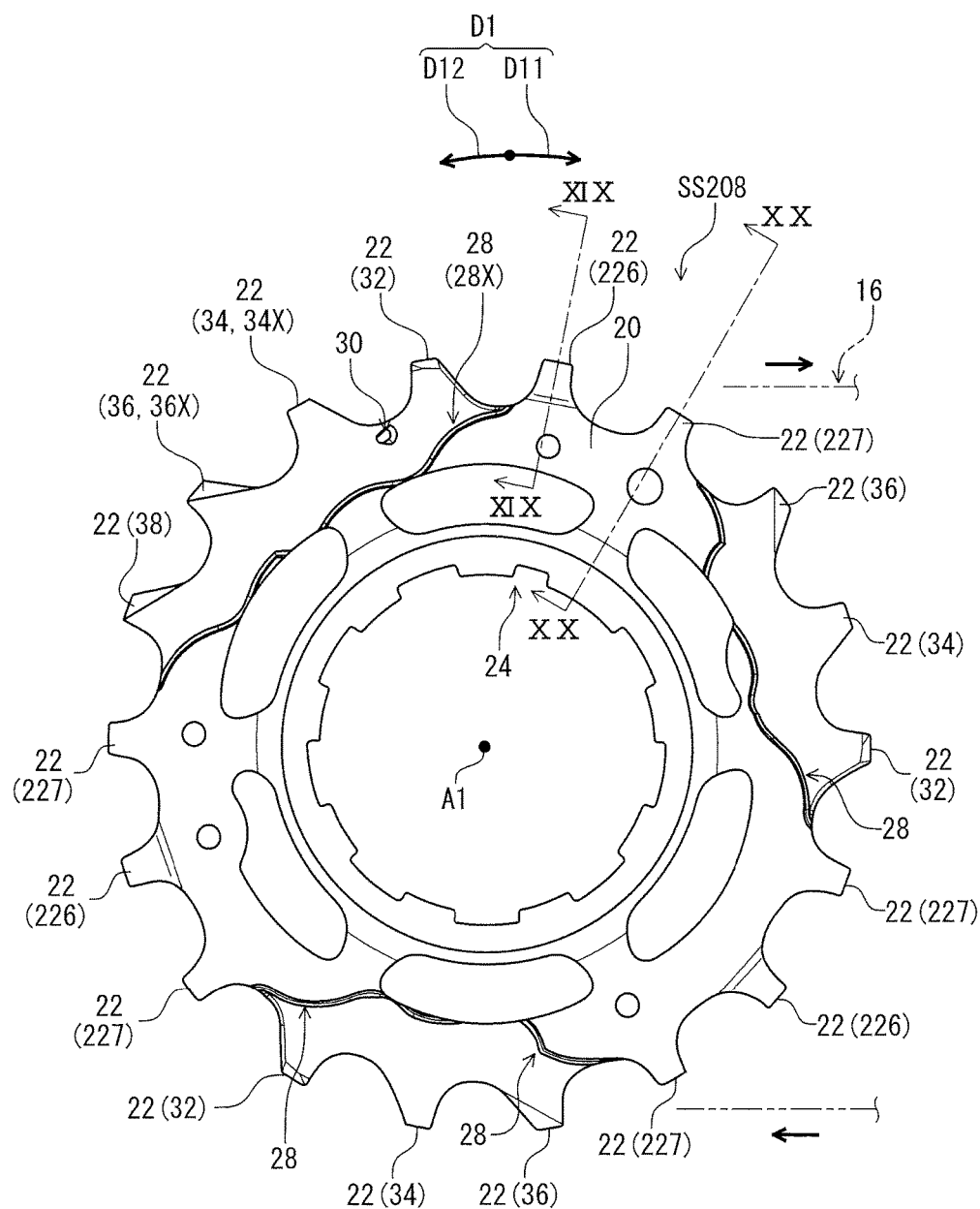
FIG. 18 is a side elevational view of a bicycle rear sprocket in accordance with a second embodiment.

As seen in FIG. 18, in the bicycle rear sprocket SS208, the plurality of sprocket teeth 22 includes a first driving tooth 226 and a second driving tooth 227. In this embodiment, the plurality of sprocket teeth 22 includes a plurality of first driving teeth 226 and a plurality of second driving teeth 227. However, a total number of the first driving teeth 226 is not limited to this embodiment. A total number of the second driving teeth 227 is not limited to this embodiment.

Figure 19:
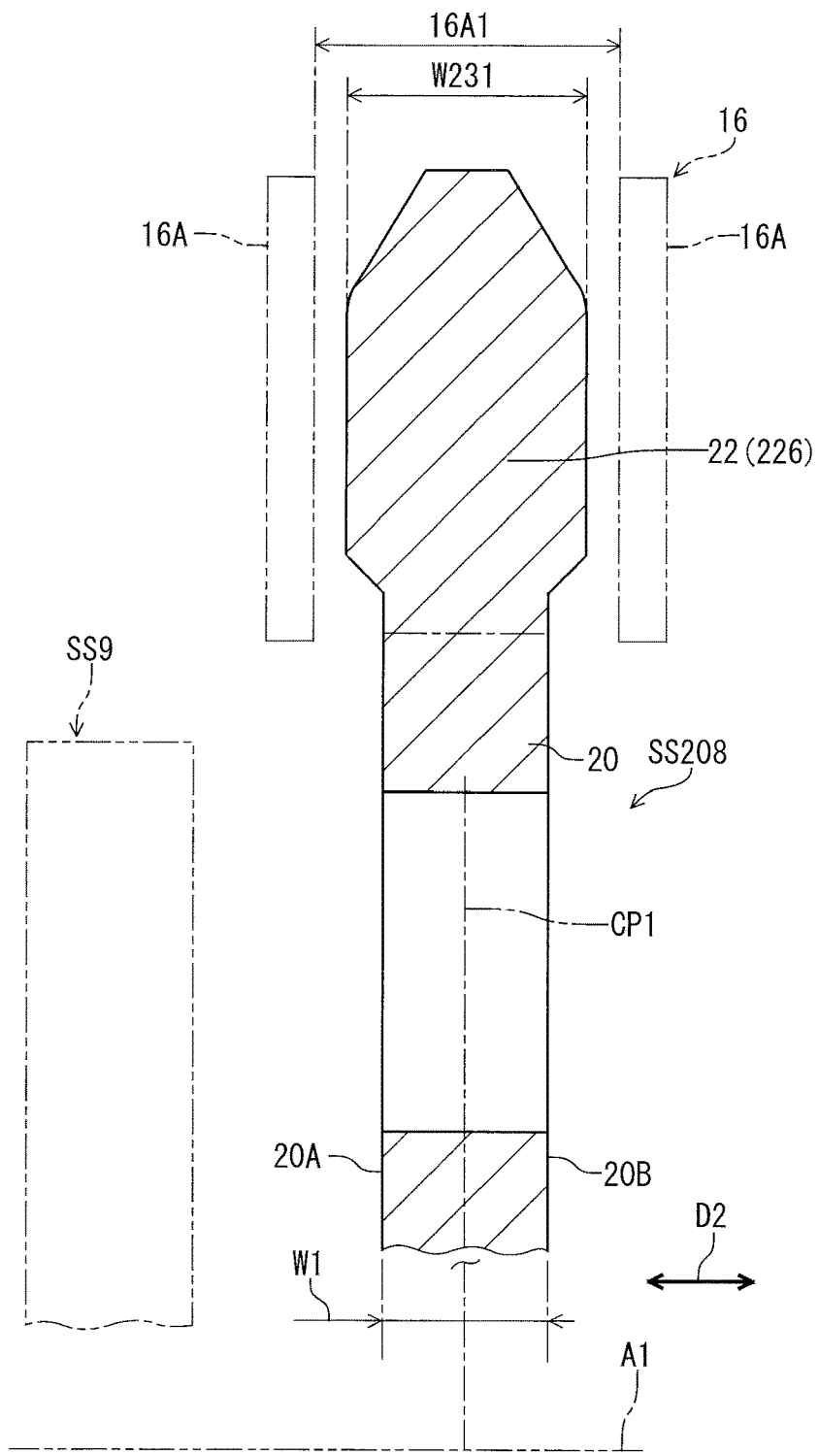
FIG. 19 is a cross-sectional view of the bicycle rear sprocket taken along line XIX-XIX of FIG. 18.
Figure 20:
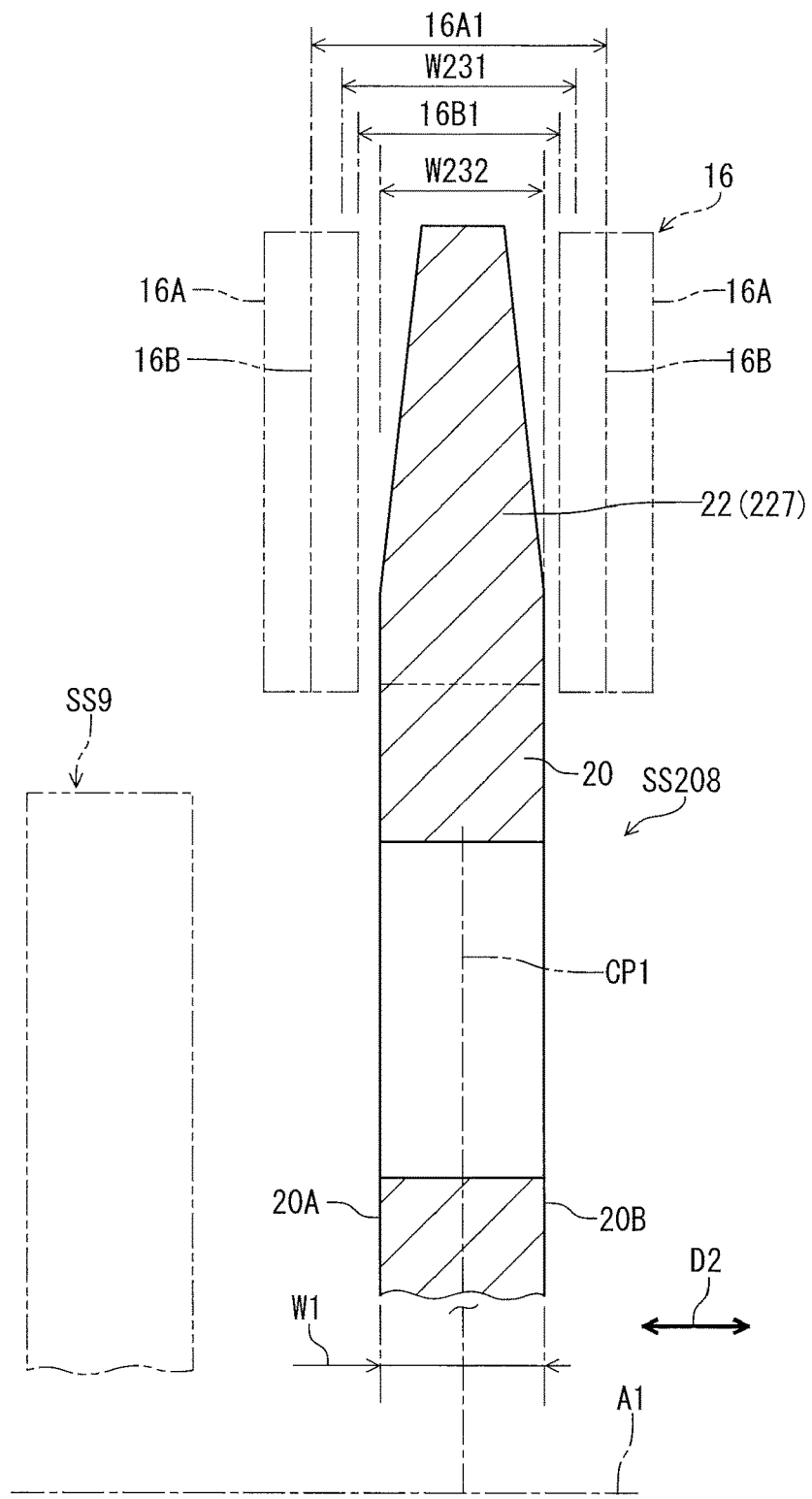
FIG. 20 is a cross-sectional view of the bicycle rear sprocket taken along line XX-XX of FIG. 18.

As seen in FIG. 19, the first driving tooth 226 has a first maximum axial width W231 extending in the axial direction D2 with respect to the rotational center axis A1 of the bicycle rear sprocket SS208. As seen in FIG. 20, the second driving tooth 227 has a second maximum axial width W232 extending in the axial direction D2. The first maximum axial width W231 is larger than the second maximum axial width W232. The first maximum axial width W231 is larger than an axial width of the inner link space 16B1 of the bicycle chain 16. The first maximum axial width W231 is smaller than an axial width of the outer link space 16A1 of the bicycle chain 16.

The structures of the first driving tooth 226 and the second driving tooth 227 can be applied to other sprockets SP1 to SP7 and SP9 to SP12.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, teams of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket comprising:
a sprocket body;
a plurality of sprocket teeth extending radially outwardly from the sprocket body;
a shifting facilitation recess to facilitate a shifting operation in which a bicycle chain is shifted between the bicycle rear sprocket and a smaller rear sprocket adjacent to the bicycle rear sprocket without another sprocket between the bicycle rear sprocket and the smaller rear sprocket; and
an upshifting facilitation projection provided in the shifting facilitation recess to support the bicycle chain in an upshifting operation in which the bicycle chain is shifted from the bicycle rear sprocket to the smaller rear sprocket.

2. The bicycle rear sprocket according to claim 1, wherein the upshifting facilitation projection is integrally provided with the sprocket body as a one-piece unitary member.

3. The bicycle rear sprocket according to claim 1, wherein the upshifting facilitation projection is a separate member from the sprocket body.

4. The bicycle rear sprocket according to claim 1, wherein
the upshifting facilitation projection includes a chain contact surface contactable with the bicycle chain in the upshifting operation,
the chain contact surface is inclined relative to a sprocket center plane perpendicular to a rotational center axis of the bicycle rear sprocket, and
the sprocket center plane bisects the bicycle rear sprocket in an axial direction with respect to the rotational center axis.

5. The bicycle rear sprocket according to claim 1, wherein
the upshifting facilitation projection includes a chain contact surface contactable with the bicycle chain in the upshifting operation, and
the chain contact surface extends in an axial direction with respect to a rotational center axis of the bicycle rear sprocket.

6. The bicycle rear sprocket according to claim 1, wherein
the upshifting facilitation projection includes a chain contact surface contactable with the bicycle chain in the upshifting operation, and
the chain contact surface includes a flat surface.

7. The bicycle rear sprocket according to claim 1, wherein
the upshifting facilitation projection includes a chain contact surface contactable with the bicycle chain in the upshifting operation, and
the chain contact surface is inclined relative to a first radial direction perpendicular to a rotational center axis of the bicycle rear sprocket, the first radial direction extending from the rotational center axis to the upshifting facilitation projection.

8. The bicycle rear sprocket according to claim 1, wherein
the upshifting facilitation projection includes a chain contact surface contactable with the bicycle chain in the upshifting operation,
the chain contact surface includes a first circumferential end and a second circumferential end,
the chain contact surface extends between the first circumferential end and the second circumferential end, and
a first radial distance provided between a rotational center axis of the bicycle rear sprocket and the first circumferential end is different from a second radial distance provided between the rotational center axis and the second circumferential end.

9. The bicycle rear sprocket according to claim 8, wherein
the first circumferential end is provided on an upstream side of the second circumferential end in a driving rotational direction in which the bicycle rear sprocket is rotated about the rotational center axis during pedaling, and
the first radial distance is smaller than the second radial distance.

10. The bicycle rear sprocket according to claim 1, wherein
the plurality of sprocket teeth includes a first tooth and a second tooth,
the first tooth and the second tooth are provided in an angular range of the shifting facilitation recess, and
the upshifting facilitation projection is provided between the first tooth and the second tooth in a circumferential direction with respect to a rotational center axis of the bicycle rear sprocket.

11. The bicycle rear sprocket according to claim 10, wherein
the shifting facilitation recess is continuously provided between the first tooth and the second tooth through the upshifting facilitation projection.

12. The bicycle rear sprocket according to claim 1, wherein
the plurality of sprocket teeth includes at least one driving tooth.

13. The bicycle rear sprocket according to claim 1, wherein
the plurality of sprocket teeth includes a first driving tooth and a second driving tooth,
the first driving tooth has a first maximum axial width extending in an axial direction with respect to a rotational center axis of the bicycle rear sprocket,
the second driving tooth has a second maximum axial width extending in the axial direction, and
the first maximum axial width is larger than the second maximum axial width.

14. The bicycle rear sprocket according to claim 1, wherein
the sprocket body includes a first axial surface and a second axial surface provided on a reverse side of the first axial surface in an axial direction with respect to a rotational center axis of the bicycle rear sprocket, and
an axial end of the upshifting facilitation projection is provided in an axial area extending from the first axial surface to the second axial surface.

* * * * *